US012488804B2

(12) United States Patent
Dick et al.

(10) Patent No.: US 12,488,804 B2
(45) Date of Patent: *Dec. 2, 2025

(54) FREQUENCY-DOMAIN AUDIO CODING SUPPORTING TRANSFORM LENGTH SWITCHING

(71) Applicant: Fraunhofer-Gesellschaft zur Foerderung der angewandten Forschung e.V., Munich (DE)

(72) Inventors: Sascha Dick, Nuremberg (DE); Christian Helmrich, Erlangen (DE); Andreas Hoelzer, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 59 days.

This patent is subject to a terminal disclaimer.

(21) Appl. No.: 18/540,819

(22) Filed: Dec. 14, 2023

(65) Prior Publication Data

US 2024/0127836 A1 Apr. 18, 2024

Related U.S. Application Data

(63) Continuation of application No. 17/227,178, filed on Apr. 9, 2021, now Pat. No. 11,862,182, which is a (Continued)

(30) Foreign Application Priority Data

Jul. 22, 2013 (EP) .................................... 13177373
Oct. 18, 2013 (EP) .................................... 13189334

(51) Int. Cl.
*G10L 19/022* (2013.01)
*G10L 19/03* (2013.01)
(Continued)

(52) U.S. Cl.
CPC ............ *G10L 19/022* (2013.01); *G10L 19/03* (2013.01); *G10L 19/008* (2013.01); *G10L 19/028* (2013.01)

(58) Field of Classification Search
CPC .............................. G10L 19/00; G10L 19/022
See application file for complete search history.

(56) References Cited

U.S. PATENT DOCUMENTS 5,394,473 A 2/1995 Davidson
5,848,391 A 12/1998 Bosi et al.
(Continued)

FOREIGN PATENT DOCUMENTS

CN 1247415 A 3/2000
CN 2482427 Y 3/2002
(Continued)

OTHER PUBLICATIONS

Herre, Jürgen, and Sascha Disch. "Perceptual audio coding." Academic press library in Signal processing. vol. 4. Elsevier, 2014. 757-800. (Year: 2014).*
(Continued)

*Primary Examiner* — Jialong He
(74) *Attorney, Agent, or Firm* — Perkins Coie LLP; Michael A. Glenn

(57) ABSTRACT

A frequency-domain audio codec is provided with the ability to additionally support a certain transform length in a backward-compatible manner, by the following: the frequency-domain coefficients of a respective frame are transmitted in an interleaved manner irrespective of the signalization signaling for the frames as to which transform length actually applies, and additionally the frequency-domain coefficient extraction and the scale factor extraction operate independent from the signalization. By this measure, old-fashioned frequency-domain audio coders/decoders, insen-
(Continued)

sitive for the signalization, would be able to nevertheless operate without faults and with reproducing a reasonable quality. Concurrently, frequency-domain audio coders/decoders able to support the additional transform length would offer even better quality despite the backward compatibility. As far as coding efficiency penalties due to the coding of the frequency domain coefficients in a manner transparent for older decoders are concerned, same are of comparatively minor nature due to the interleaving.

11 Claims, 4 Drawing Sheets

Related U.S. Application Data continuation of application No. 16/284,534, filed on Feb. 25, 2019, now Pat. No. 10,984,809, which is a continuation of application No. 15/004,563, filed on Jan. 22, 2016, now Pat. No. 10,242,682, which is a continuation of application No. PCT/EP2014/065169, filed on Jul. 15, 2014.

(51) Int. Cl.
*G10L 19/008* (2013.01)
*G10L 19/028* (2013.01)

(56) References Cited

U.S. PATENT DOCUMENTS

| | | | |
|---|---|---|---|
| 6,131,084 | A | 10/2000 | Hardwick |
| 6,353,807 | B1 | 3/2002 | Tsutsui et al. |
| 6,424,936 | B1 | 7/2002 | Shen et al. |
| 6,950,794 | B1 | 9/2005 | Subramaniam et al. |
| 6,978,236 | B1 | 12/2005 | Liljeryd et al. |
| 7,283,968 | B2 | 10/2007 | Youn |
| 7,860,709 | B2 | 12/2010 | Maekinen |
| 7,953,595 | B2 | 5/2011 | Xie et al. |
| 8,428,957 | B2 | 4/2013 | Garudadri et al. |
| 10,242,268 | B2 | 3/2019 | Harris et al. |
| 10,984,809 | B2 | 4/2021 | Dick et al. |
| 2002/0138259 | A1 | 9/2002 | Kawahara |
| 2004/0131204 | A1 | 7/2004 | Vinton |
| 2005/0185850 | A1 | 8/2005 | Vinton et al. |
| 2005/0267744 | A1 | 12/2005 | Nettre et al. |
| 2006/0074642 | A1 | 4/2006 | You |
| 2006/0122825 | A1 | 6/2006 | Oh et al. |
| 2008/0059202 | A1 | 3/2008 | You |
| 2008/0065373 | A1 | 3/2008 | Oshikiri et al. |
| 2008/0140428 | A1 | 6/2008 | Choo et al. |
| 2008/0253440 | A1 | 10/2008 | Srinivasan et al. |
| 2009/0012797 | A1 | 1/2009 | Boehm et al. |
| 2009/0319278 | A1 | 12/2009 | Yoon et al. |
| 2010/0017213 | A1 | 1/2010 | Edler et al. |
| 2010/0076754 | A1 | 3/2010 | Kovesi et al. |
| 2010/0094637 | A1 | 4/2010 | Vinton |
| 2010/0114583 | A1 | 5/2010 | Lee et al. |
| 2010/0286991 | A1 | 11/2010 | Hedelin et al. |
| 2011/0046966 | A1 | 2/2011 | Dalimba |
| 2011/0238425 | A1 | 9/2011 | Neuendorf et al. |
| 2011/0238426 | A1 | 9/2011 | Fuchs et al. |
| 2011/0257982 | A1 | 10/2011 | Smithers |
| 2012/0271644 | A1 | 10/2012 | Bessette et al. |
| 2013/0030819 | A1 | 1/2013 | Purnhagen et al. |
| 2013/0182862 | A1 | 7/2013 | Disch |
| 2013/0253938 | A1 | 9/2013 | You |
| 2014/0257824 | A1 | 9/2014 | Taleb et al. |
| 2014/0310011 | A1 | 10/2014 | Biswas et al. |
| 2016/0050420 | A1 | 2/2016 | Helmrich et al. |

FOREIGN PATENT DOCUMENTS

| | | | |
|---|---|---|---|
| CN | 1625768 | A | 6/2005 |
| CN | 1677493 | A | 10/2005 |
| CN | 1735925 | A | 2/2006 |
| CN | 1926609 | A | 3/2007 |
| CN | 101061533 | A | 10/2007 |
| CN | 101494054 | A | 7/2009 |
| CN | 101939781 | A | 1/2011 |
| CN | 102113051 | A | 6/2011 |
| CN | 102177426 | A | 9/2011 |
| CN | 102483923 | A | 5/2012 |
| EP | 2304719 | A1 | 4/2011 |
| JP | 10293600 | A | 11/1998 |
| JP | 2003510644 | A | 3/2003 |
| JP | 2005338637 | A | 12/2005 |
| JP | 2008129250 | A | 6/2008 |
| JP | 2009500682 | A | 1/2009 |
| JP | 2009500683 | A | 1/2009 |
| JP | 2009500684 | A | 1/2009 |
| JP | 2010500631 | A | 1/2010 |
| JP | 4731775 | B2 | 4/2011 |
| JP | 2013508765 | A | 3/2013 |
| RU | 2455709 | C2 | 7/2012 |
| RU | 2483365 | C2 | 5/2013 |
| WO | 0036753 | A1 | 6/2000 |
| WO | 0122403 | A1 | 3/2001 |
| WO | 2004079923 | A2 | 9/2004 |
| WO | 2004082288 | A1 | 9/2004 |
| WO | 2005034080 | A2 | 4/2005 |
| WO | 2007008000 | A2 | 1/2007 |
| WO | 2007008001 | A2 | 1/2007 |
| WO | 2007008002 | A2 | 1/2007 |
| WO | 2010003556 | A1 | 1/2010 |
| WO | 2010040522 | A2 | 4/2010 |
| WO | 2011147950 | A1 | 12/2011 |
| WO | 2012161675 | A1 | 11/2012 |
| WO | 2013079524 | A2 | 6/2013 |

OTHER PUBLICATIONS

Johnston, James D., et al. "MPEG audio coding." Wavelet, subband and block transforms in communications and multimedia. Boston, MA: Springer US, 1999. 207-253. (Year: 1999).*

Bosi, M, et al., "Final Text of ISO/IEC 13818-7 AAC", 39. MPEG Meeting; Apr. 7, 1997-Apr. 11, 1997; Bristol; (Motion Picture Expert Group or ISO/IEC JTC1/SC29/WG11), No. N1650, Apr. 11, 1997 (Apr. 11, 1997), XP030010416. Uploaded in two parts.

Bosi, Marina, et al. "ISO/IEC MPEG-2 advanced audio coding." Journal of the Audio engineering society 45.10 (1997): 789-814. ( Year: 1997).

Brandenburg, Karlheinz, and Gerhard Stoll. "ISO/MPEG-1 audio: a generic standard for coding of high-quality digital audio." Journal of the Audio Engineering Society 42.10 (1994): 780-792. (Year: 1994).

Noll, Peter. "MPEG digital audio coding." IEEE signal processing magazine 14.5 (1997): 59-81. (Year: 1997).

"ATSC Standard: Digital Audio Compression (AC-3, E-AC-3)", Advanced Television Systems Committee. Doc.A/52:2012, Dec. 17, 2012, pp. 1-270.

"Information technology—Generic coding of moving pictures and associated audio information—Part 7: Advanced Audio Coding (AAC)", ISO/IEC 13818-7:2004(E), Third edition, Oct. 15, 2004, 206 pp.

Bosi, M. , et al., "Final Text of ISO/IEG 13818-7 AAC", 39. MPEG Meeting Apr. 7, 1997-Apr. 11, 1997; Bristol, Motion Picture Expert Group or ISO/IEG JTG1/SG29/WG11, No. N1650, pp. 1-106.

Bosi, Marina , et al., "ISO/IEC MPEG-2 Advanced Audio Coding", J. Audio Eng. Soc., vol. 45, No. 10—Oct. 1997, pp. 789-814.

Davidson, G.A. , et al., "Digital Audio Coding: Dolby AC-3, Digital Signal Processing Handbook", CRC Press LLC-IEEE Press, 1999.

Davidson, Grant A, "Digital Audio Coding: Dolby AC-3", In: The Digital Signal Processing Handbook, CRC Press LLC, IEEE Press, XP055140739, ISBN: 978-0-84-938572-8, p. 41. 3, line 12, paragraph 41.1—p. 41.4, line 6; figures 41.2, 41.3 p. 41.6, paragraph 41.3,—p. 41.9, paragraph 41.4 p. 41.12, par, Jan. 1, 1999, pp. 41.1-41.22.

Herre, Jurgen , et al., "Enhancing the Performance of Perceptual Audio Coders by Using Temporal Noise Shaping (TNS)", Audio Engineering Society Convention 101. Audio Engineering Society 1996.

(56) References Cited

OTHER PUBLICATIONS

Hui, Dai , "Digital Video Technology", Bejing, Dec. 2012, 30 pages, 1-30.
ISO/IEC 14496-3:2009 , "Information Technology—Coding of Audio-Visual Objects—Part 3: Audio", International Organization for Standardization, Geneva, Switzerland, Aug. 2009.
ISO/IEC 23003-3 , "Information Technology—MPEG audio technologies—Part 3: Unified Speech and Audio Coding", International Organization for Standardization, Geneva, Jan. 2012, 286 pages.
ITU-T , "G.719: Low-complexity, full-band audio coding for high-quality, conversational applications", Recommendation ITU-T G.719, Telecommunication Standardization Sector of ITU,, Jun. 2008, 58 pages.
Johnston, J.D. , et al., "Sum-Difference Stereo Transform Coding", in Proc. IEEE ICASSP-92, vol. 2, pp. II-569-II-572.
Johnston, James D, et al., "MPEG Audio Coding", Wavelet, subband and block transforms in communications and multimedia. Springer, Boston, MA 2002. 207-253, 2002, pp. 207-253.
Neuendorf, Max , et al., "MPEG Unified Speech and Audio Coding—The ISO/MPEG Standard for High-Efficiency Audio Coding of all Content Types", Audio Engineering Society Convention Paper 8654, Presented at the 132nd Convention—Apr. 26, 2012, pp. 1-22.
Ravelli, Emmanuel , et al., "Union of MDCT Bases for Audio Coding", IEEE Transactions on Audio, Speech and Language Processing, IEEE Service Center, vol. 16, No. 8, XP011236278, ISSN: 1558-7916, DOI: 10.1109/TASL.2008.2004290, pp. 1361-1372.
Sperschneider, Ralph , "Text of ISO/IEC13818-7:2004 (MPEG-2 AAC 3rd edition)", ISO/IEC JTC1/SC29/WG11 N6428, Munich, Germany,, pp. 1-198.
Valin, JM , et al., "Defintion of the Opus Audio Codec", IETF, pp. 1-326.

* cited by examiner

FREQUENCY-DOMAIN AUDIO CODING SUPPORTING TRANSFORM LENGTH SWITCHING

CROSS-REFERENCE TO RELATED APPLICATIONS

This application is a continuation of U.S. patent application Ser. No. 17/227,178, filed Apr. 9, 2021, which is a continuation of U.S. patent application Ser. No. 16/284,534, filed Feb. 25, 2019, now U.S. Pat. No. 10,984,809, which is a continuation of U.S. patent application Ser. No. 15/004,563, filed Jan. 22, 2016, now U.S. Pat. No. 10,242,682, which is a continuation of International Application No. PCT/EP2014/065169, filed Jul. 15, 2014, which is incorporated herein by reference in its entirety, and additionally claims priority from European Applications Nos. EP13177373.1, filed Jul. 22, 2013, and EP13189334.9, filed Oct. 18, 2013, which are all incorporated herein by reference in their entirety.

BACKGROUND OF THE INVENTION

The present application is concerned with frequency-domain audio coding supporting transform length switching.

Modern frequency-domain speech/audio coding systems such as the Opus/Celt codec of the IETF [1], MPEG-4 (HE-)AAC [2] or, in particular, MPEG-D xHE-AAC (USAC) [3], offer means to code audio frames using either one long transform—a long block—or eight sequential short transforms—short blocks—depending on the temporal stationarity of the signal.

For certain audio signals such as rain or applause of a large audience, neither long nor short block coding yields satisfactory quality at low bitrates. This can be explained by the density of prominent transients in such recordings; coding only with long blocks can cause frequent and audible time-smearing of the coding error, also known as pre-echo, whereas coding only with short blocks is generally inefficient due to increased data overhead, leading to spectral holes.

Accordingly, it would be favorable to have a frequency-domain audio coding concept at hand which supports transform lengths which are also suitable for the just-outlined kinds of audio signals. Naturally, it would be feasible to build-up a new frequency-domain audio codec supporting switching between a set of transform lengths which, inter alias, encompasses a certain wanted transform length suitable for a certain kind of audio signal. However, it is not an easy task to get a new frequency-domain audio codec adopted in the market. Well-known codecs are already available and used frequently. Accordingly, it would be favorable to be able to have a concept at hand which enables existing frequency-domain audio codecs to be extended in a way so as to additionally support a wanted, new transform length, but which, nevertheless, keeps backward compatibility with existing coders and decoders.

SUMMARY

According to an embodiment, a frequency-domain audio decoder supporting transform length switching may have: a frequency-domain coefficient extractor configured to extract frequency-domain coefficients of frames of an audio signal from a data stream; a scale factor extractor configured to extract scale factors from the data stream; an inverse transformer configured to subject the frequency-domain coefficients of the frames, scaled according to the scale factors, to inverse transformation to acquire time-domain portions of the audio signal; a combiner configured to combine the time-domain portions to acquire the audio signal, wherein the inverse transformer is responsive to a signalization within the frames of the audio signal so as to, depending on the signalization, form one transform by sequentially arranging the frequency-domain coefficients of a respective frame, scaled according to the scale factors, in a non-de-interleaved manner and subject the one transform to an inverse transformation of a first transform length, or form more than one transform by de-interleaving the frequency-domain coefficients of the respective frame, scaled according to the scale factors, and subject each of the more than one transforms to an inverse transformation of a second transform length, shorter than the first transform length, wherein the frequency-domain coefficient extractor and the scale factor extractor operate independent from the signalization.

According to another embodiment, frequency-domain audio encoder supporting transform length switching may have: a transformer configured to subject time-domain portions of an audio signal to transformation to acquire frequency-domain coefficients of frames of the audio signal; an inverse scaler configured to inversely scale the frequency-domain coefficients according to scale factors; a frequency-domain coefficient inserter configured to insert the frequency-domain coefficients of the frames of the audio signal, inversely scaled according to scale factors, into the data stream; and a scale factor inserter configured to insert scale factors into the data stream, wherein the transformer is configured to switch for the frames of the audio signals at least between performing one transform of a first transform length for a respective frame, and performing more than one transform of a second transform length, shorter than the first transform length, for the respective frame, wherein the transformer is further configured to signal the switching by a signalization within the frames of the data stream; wherein the frequency-domain coefficient inserter is configured to insert, for a respective frame, a sequence of the frequency-domain coefficients of the respective frame of the audio signal, inversely scaled according to scale factors, into the data stream in a manner independent from the signalization, with, depending on the signalization, the sequence of frequency-domain coefficients formed by sequentially arranging the frequency-domain coefficients of the one transform of a respective frame in a non-interleaved manner in case of one transform performed for the respective frame, and by interleaving the frequency-domain coefficients of the more than one transform of the respective frame in case of more than one transform performed for the respective frame, wherein the scale factor inserter operates independent from the signalization.

According to another embodiment, a method for frequency-domain audio decoding supporting transform length switching may have the steps of: extracting frequency-domain coefficients of frames of an audio signal from a data stream; extracting scale factors from the data stream; subjecting the frequency-domain coefficients of the frames, scaled according to scale factors, to inverse transformation to acquire time-domain portions of the audio signal; combining the time-domain portions to acquire the audio signal, wherein the subjection to inverse transformation is responsive to a signalization within the frames of the audio signal so as to, depending on the signalization, include forming one transform by sequentially arranging the frequency-domain coefficients of a respective frame in a non-de-interleaved manner and subjecting the one transform to an inverse transformation of a first transform length, or forming more than one transform by de-interleaving the frequency-domain coefficients of the respective frame and subjecting each of the more than one transforms to an inverse transformation of a second transform length, shorter than the first transform length, wherein the extraction of the frequency-domain coefficients and the extraction of the scale factors are independent from the signalization.

According to yet another embodiment, a method for frequency-domain audio encoding supporting transform length switching may have the steps of: subjecting time-domain portions of an audio signal to transformation to acquire frequency-domain coefficients of frames of the audio signal; inversely scaling the frequency-domain coefficients according to scale factors; inserting the frequency-domain coefficients of the frames of the audio signal, inversely scaled according to scale factors, into the data stream; and inserting scale factors into the data stream, wherein the subjection to transformation switches for the frames of the audio signal at least between performing one transform of a first transform length for a respective frame, and performing more than one transform of a second transform length, shorter than the first transform length, for the respective frame, wherein the method includes signaling the switching by a signalization within the frames of the data stream; wherein the insertion of the frequency-domain coefficients is performed by inserting, for a respective frame, a sequence of the frequency-domain coefficients of the respective frame of the audio signal, inversely scaled according to scale factors, into the data stream in a manner independent from the signalization, with, depending on the signalization, the sequence of frequency-domain coefficients formed by sequentially arranging the frequency-domain coefficients of the one transform of the respective frame in a non-interleaved manner in case of one transform performed for the respective frame, and by interleaving the frequency-domain coefficients of the more than one transform of the respective frame in case of more than one transform performed for the respective frame, wherein the insertion of scale factors is performed independent from the signalization.

According to yet another embodiment, a non-transitory digital storage medium may have a computer program stored thereon to perform the inventive methods, when said computer program is run by a computer.

The present invention is based on the finding that a frequency-domain audio codec may be provided with the ability to additionally support a certain transform length in a backward-compatible manner, when the frequency-domain coefficients of a respective frame are transmitted in an interleaved manner irrespective of the signalization signaling for the frames as to which transform length actually applies, and when additionally the frequency-domain coefficient extraction and the scale factor extraction operate independent from the signalization. By this measure, old-fashioned frequency-domain audio coders/decoders, insensitive for the signalization, would be able to nevertheless operate without faults and with reproducing a reasonable quality. Concurrently, frequency-domain audio coders/decoders being responsive to the switching to/from the additionally supported transform length would achieve even better quality despite the backward compatibility. As far as coding efficiency penalties due to the coding of the frequency domain coefficients in a manner transparent for older decoders are concerned, same are of comparatively minor nature due to the interleaving.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
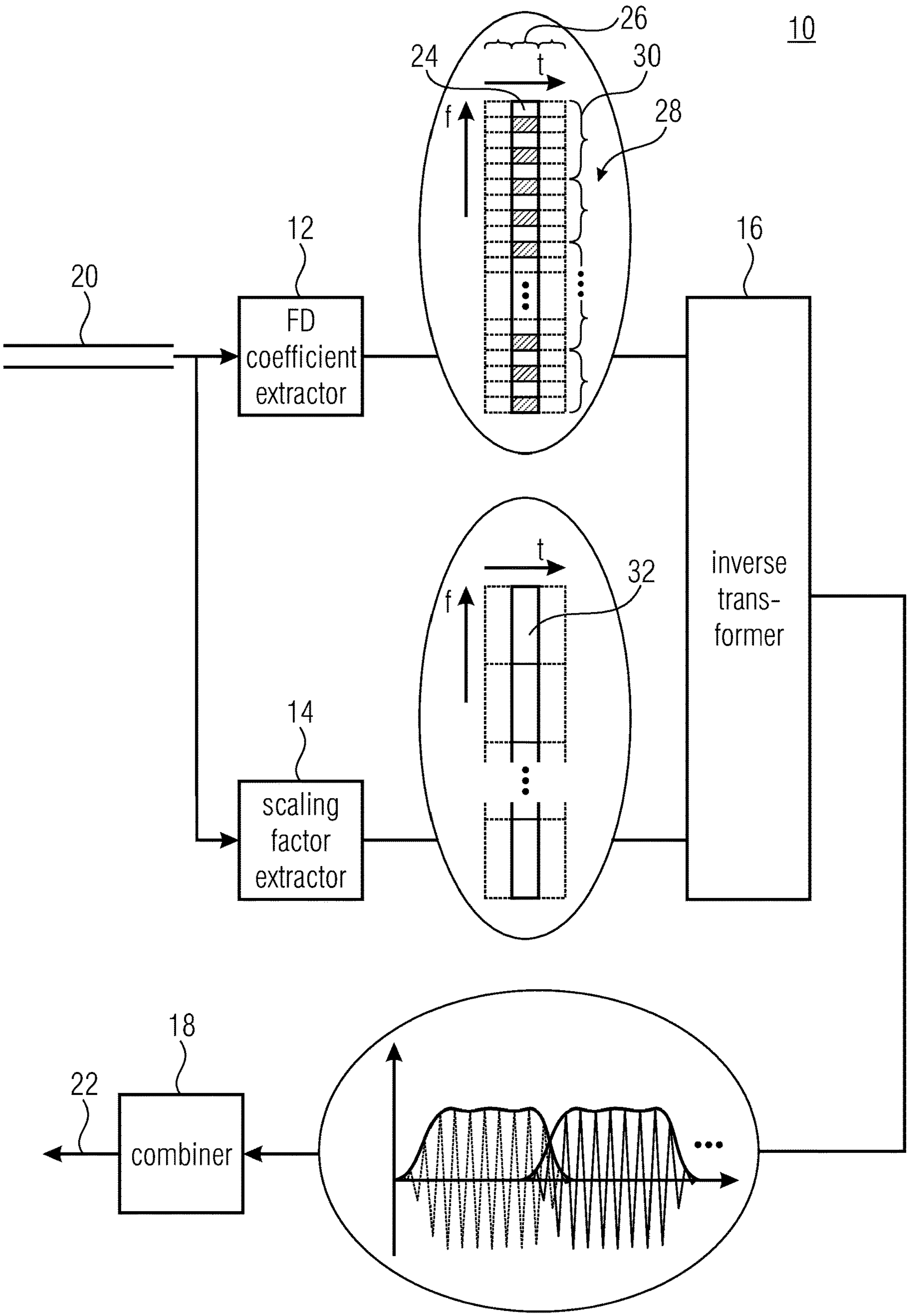
FIG. 1 shows a schematic block diagram of a frequency-domain audio decoder in accordance with an embodiment.

FIG. 1 shows a frequency-domain audio decoder supporting transform length switching in accordance with an embodiment of the present application. The frequency-domain audio decoder of FIG. 1 is generally indicated using reference sign 10 and comprises a frequency-domain coefficient extractor 12, a scaling factor extractor 14, an inverse transformer 16, and a combiner 18. At their input, frequency-domain coefficient extractor and scaling factor extractor 12 and 14 have access to an inbound data stream 20. Outputs of frequency-domain coefficient extractor 12 and scaling factor extractor 14 are connected to respective inputs of inverse transformer 16. Inverse transformer's 16 output, in turn, is connected to an input of combiner 18. The latter outputs the reconstructed audio signal at an output 22 of encoder 10.

The frequency-domain coefficient extractor 12 is configured to extract frequency-domain coefficients 24 of frames 26 of the audio signal from data stream 20. The frequency-domain coefficients 24 may be MDCT coefficients or may belong to some other transform such as another lapped transform. In a manner described further below, the frequency-domain coefficients 24 belonging to a certain frame 26 describe the audio signal's spectrum within the respective frame 26 in a varying spectro-temporal resolution. The frames 26 represent temporal portions into which the audio signal is sequentially subdivided in time. Putting together all frequency-domain coefficients 24 of all frames, same represent a spectrogram 28 of the audio signal. The frames 26 may, for example, be of equal length. Due to the kind of audio content of the audio signal changing over time, it may be disadvantageous to describe the spectrum for each frame 26 with continuous spectro-temporal resolution by use of, for example, transforms having a constant transform length which spans, for example, the time-length of each frame 26, i.e. involves sample values within this frame 26 of the audio signal as well as time-domain samples preceding and succeeding the respective frame. Pre-echo artifacts may, for example, result from lossy transmitting the spectrum of the respective frame in form of the frequency-domain coefficients 24. Accordingly, in a manner further outlined below, the frequency-domain coefficients 24 of a respective frame 26 describe the spectrum of the audio signal within this frame 26 in a switchable spectro-temporal resolution by switching between different transform lengths. As far as the frequency-domain coefficient extractor 12 is concerned, however, the latter circumstance is transparent for the same. The frequency-domain coefficient extractor 12 operates independent from any signalization signaling the just-mentioned switching between different spectro-temporal resolutions for the frames 26.

The frequency-domain coefficient extractor 12 may use entropy coding in order to extract the frequency-domain coefficients 24 from data stream 20. For example, the frequency-domain coefficient extractor may use context-based entropy decoding, such as variable-context arithmetic decoding, to extract the frequency-domain coefficients 24 from the data stream 20 with assigning, to each of frequency-domain coefficients 24, the same context regardless of the aforementioned signalization signaling the spectro-temporal resolution of the frame 26 to which the respective frequency-domain coefficient belongs. Alternatively, and as a second example, the extractor 12 may use Huffman decoding and define a set of Huffman codewords irrespective of said signalization specifying the resolution of frame 26.

Different possibilities exist for the way the frequency-domain coefficients 24 describe the spectrogram 28. For example, the frequency-domain coefficients 24 may merely represent some prediction residual. For example, the frequency-domain coefficients may represent a residual of a prediction which, at least partially, has been obtained by stereo prediction from another audio signal representing a corresponding audio channel or downmix out of a multi-channel audio signal to which the signal spectrogram 28 belongs. Alternatively, or additionally to a prediction residual, the frequency-domain coefficients 24 may represent a sum (mid) or a difference (side) signal according to the M/S stereo paradigm [5]. Further, frequency-domain coefficients 24 may have been subject to temporal noise shaping.

Beyond that, the frequency-domain coefficients 12 are quantized and in order to keep the quantization error below a psycho-acoustic detection (or masking) threshold, for example, the quantization step size is spectrally varied in a manner controlled via respective scaling factors associated with the frequency-domain coefficients 24. The scaling factor extractor 14 is responsible for extracting the scaling factors from the data stream 20.

Briefly spending a little bit more detail on the switching between different spectro-temporal resolutions from frame to frame, the following is noted. As will be described in more detail below, the switching between different spectro-temporal resolutions will indicate that either, within a certain frame 26, all frequency-domain coefficients 24 belong to one transform, or that the frequency-domain coefficients 24 of the respective frame 26 actually belong to different transforms such as, for example, two transforms, the transform length of which is half the transform length of the just-mentioned one transform. The embodiment described hereinafter with respect to the figures assumes the switching between one transform on the one hand and two transforms on the other hand, but in fact, a switching between the one transform and more than two transforms would, in principle, be feasible as well with the embodiments given below being readily transferable to such alternative embodiments.

FIG. 1 illustrates, using hatching, the exemplary case that the current frame is of the type represented by two short transforms, one of which has been derived using a trailing half of current frame 26, and the other one of which has been obtained by transforming a leading half of the current frame 26 of the audio signal. Due to the shortened transform length the spectral resolution at which the frequency-domain coefficients 24 describe the spectrum of frame 26 is reduced, namely halved in case of using two short transforms, while the temporal resolution is increased, namely doubled in the present case. In FIG. 1, for example, the frequency-domain coefficients 24 shown hatched shall belong to the leading transform, whereas the non-hatched ones shall belong to the trailing transform. Spectrally co-located frequency-domain coefficients 24, thus, describe the same spectral component of the audio signal within frame 26, but at slightly different time instances, namely at two consecutive transform windows of the transform splitting frame.

In data stream 20, the frequency-domain coefficients 24 are transmitted in an interleaved manner so that spectrally corresponding frequency-domain coefficients of the two different transforms immediately follow each other. In even other words, the frequency-domain coefficients 24 of a split transform frame, i.e. a frame 26 for which the transform splitting is signaled in the data stream 20, are transmitted such that if the frequency-domain coefficients 24 as received from the frequency-domain coefficient extractor 12 would be sequentially ordered in a manner as if they were frequency-domain coefficients of a long transform, then they are arranged in this sequence in an interleaved manner so that spectrally co-located frequency-domain coefficients 24 immediately neighbor each other and the pairs of such spectrally co-located frequency-domain coefficients 24 are ordered in accordance with a spectral/frequency order. Interestingly, ordered in such a manner, the sequence of interleaved frequency-domain coefficients 24 look similar to a sequence of frequency-domain coefficients 24 having been obtained by one long transform. Again, as far as the frequency-domain coefficient extractor 12 is concerned, the switching between different transform lengths or spectro-temporal resolutions in units of the frames 26 is transparent for the same, and accordingly, the context selection for entropy-coding the frequency-domain coefficients 24 in a context-adaptive manner results in the same context being selected—irrespective of the current frame actually being a long transform frame or the current frame being of the split transform type without extractor 12 knowing thereabout. For example, the frequency-domain coefficient extractor 12 may select the context to be employed for a certain frequency-domain coefficient based on already coded/decoded frequency-domain coefficients in a spectro-temporal neighborhood with this spectro-temporal neighborhood being defined in the interleaved state depicted in FIG. 1. This has the following consequence. Imagine, a currently coded/decoded frequency-domain coefficient 24 was part of the leading transform indicated using hatching in FIG. 1. An immediately spectrally adjacent frequency-domain coefficient would then actually be a frequency-domain coefficient 24 of the same leading transform (i.e. a hatched one in FIG. 1). Nevertheless, however, the frequency-domain coefficient extractor 12 uses for context selection, a frequency-domain coefficient 24 belonging to the trailing transform, namely the one being spectrally neighboring (in accordance with a reduced spectral resolution of the shortened transform), assuming that the latter would be the immediate spectral neighbor of one long transform of the current frequency-domain coefficient 24. Likewise, in selecting the context for a frequency-domain coefficient 24 of a trailing transform, the frequency-domain coefficient extractor 12 would use as an immediate spectral neighbor a frequency-domain coefficient 24 belonging to the leading transform, and being actually spectrally co-located to that coefficient. In particular, the decoding order defined among coefficients 24 of current frame 26 could lead, for example, from lowest frequency to highest frequency. Similar observations are valid in case of the frequency-domain coefficient extractor 12 being configured to entropy decode the frequency-domain coefficients 24 of a current frame 26 in groups/tuples of immediately consecutive frequency-domain coefficients 24 when ordered non-de-interleaved. Instead of using the tuple of spectrally neighboring frequency-domain coefficients 24 solely belonging to the same short transform, the frequency-domain coefficient extractor 12 would select the context for a certain tuple of a mixture of frequency-domain coefficients 24 belonging to different short transforms on the basis of a spectrally neighboring tuple of such a mixture of frequency-domain coefficients 24 belonging to the different transforms.

Due to the fact that, as indicated above, in the interleaved state, the resulting spectrum as obtained by two short transforms looks very similar to a spectrum obtained by one long transform, the entropy coding penalty resulting from the agnostic operation of frequency-domain coefficient extractor 12 with respect to the transform length switching is low.

The description of decoder 10 is resumed with the scaling factor extractor 14 which is, as mentioned above, responsible for extracting the scaling factors of the frequency-domain coefficients 24 from data stream 20. The spectral resolution at which scale factors are assigned to the frequency-domain coefficients 24 is coarser than the comparatively fine spectral resolution supported by the long transform. As illustrated by curly brackets 30, the frequency-domain coefficients 24 may be grouped into multiple scale factor bands. The subdivision in the scale factor bands may be selected based on psycho-acoustic thoughts and may, for example, coincide with the so-called Bark (or critical) bands. As the scaling factor extractor 14 is agnostic for the transform length switching, just as frequency-domain coefficient extractor 12 is, scaling factor extractor 14 assumes each frame 26 to be subdivided into a number of scale factor bands 30 which is equal, irrespective of the transform length switching signalization, and extracts for each such scale factor band 30 a scale factor 32. At the encoder-side, the attribution of the frequency-domain coefficients 24 to these scale factor bands 30 is done in the non-de-interleaved state illustrated in FIG. 1.

As a consequence, as far as frames 26 corresponding to the split transform are concerned, each scale factor 32 belongs to a group populated by both, frequency-domain coefficients 24 of the leading transform, and frequency-domain coefficients 24 of the trailing transform.

The inverse transformer 16 is configured to receive for each frame 26 the corresponding frequency-domain coefficients 24 and the corresponding scale factors 32 and subject the frequency-domain coefficients 24 of the frame 26, scaled according to the scale factors 32, to an inverse transformation to acquire time-domain portions of the audio signal. A lapped transform may be used by inverse transformer 16 such as, for example, a modified discrete cosine transform (MDCT). The combiner 18 combines the time-domain portions to obtain the audio signal such as by use of, for example, a suitable overlap-add process resulting in, for example, time-domain aliasing cancelation within the overlapping portions of the time-domain portions output by inverse transformer 16.

Naturally, the inverse transformer 16 is responsive to the aforementioned transform length switching signaled within the data stream 20 for the frames 26. The operation of inverse transformer 16 is described in more detail with respect to FIG. 2.

Figure 2:
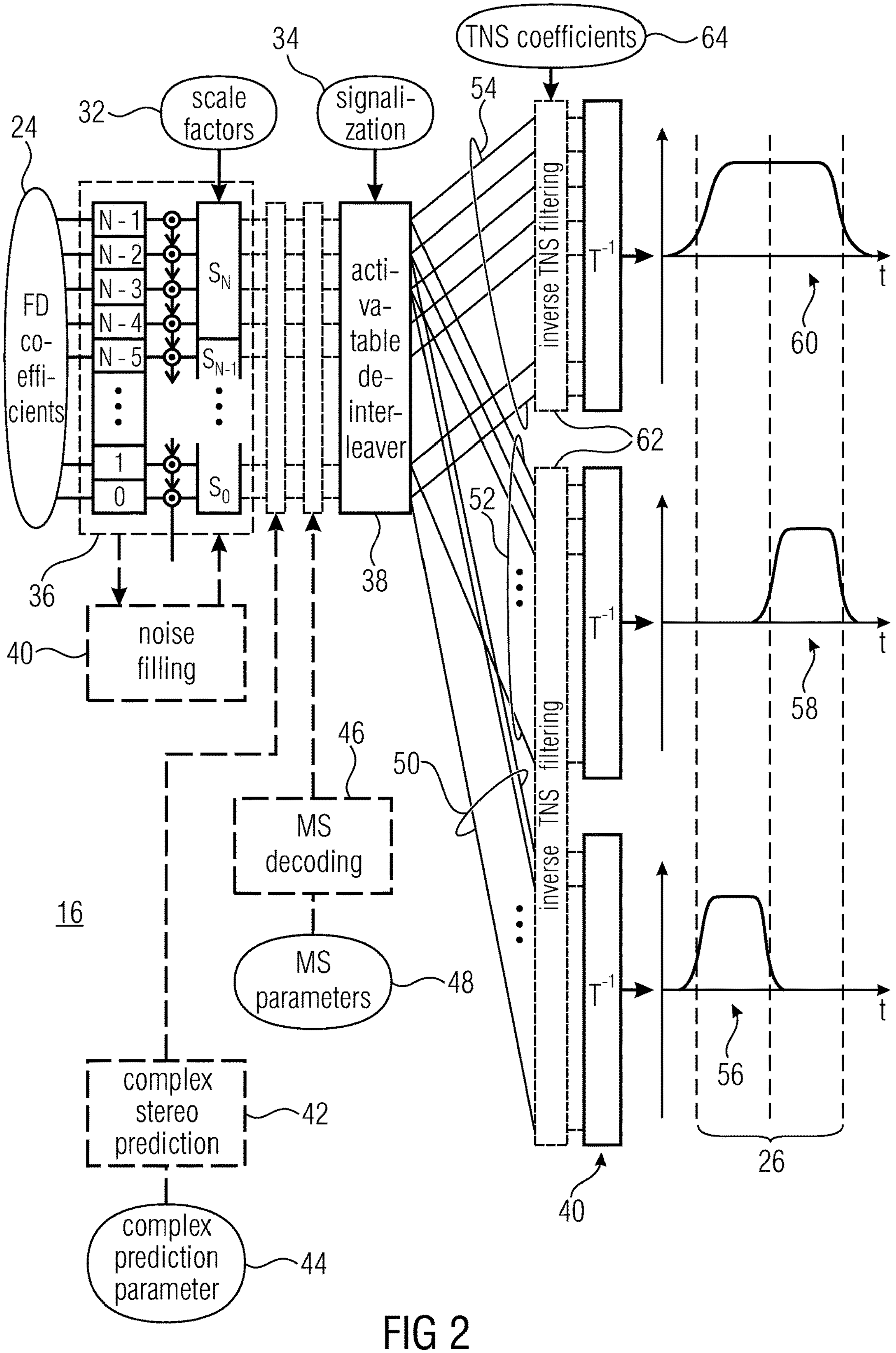
FIG. 2 shows a schematic illustrating the functionality of the inverse transformer of FIG. 1.

FIG. 2 shows a possible internal structure of the inverse transformer 16 in more detail. As indicated in FIG. 2, the inverse transformer 16 receives for a current frame the frequency-domain coefficients 24 associated with that frame, as well as the corresponding scale factors 32 for de-quantizing the frequency-domain coefficients 24. Further, the inverse transformer 16 is controlled by the signalization 34 which is present in data stream 20 for each frame. The inverse transformer 16 may further be controlled via other components of the data stream 20 optionally comprised therein. In the following description, the details concerning these additional parameters are described.

As shown in FIG. 2, the inverse transformer 16 of FIG. 2 comprises a de-quantizer 36, an activatable de-interleaver 38 and an inverse transformation stage 40. For the ease of understanding the following description, the inbound frequency-domain coefficients 24 as derived for the current frame from frequency-domain coefficient extractor 12 are shown to be numbered from 0 to N−1. Again, as the frequency-domain coefficient extractor 12 is agnostic to, i.e. operates independent from, signalization 34, frequency-domain coefficient extractor 12 provides the inverse transformer 16 with frequency-domain coefficients 24 in the same manner irrespective of the current frame being of the split transform type, or the 1-transform type, i.e. the number of frequency-domain coefficients 24 is N in the present illustrative case and the association of the indices 0 to N−1 to the N frequency-domain coefficients 24 also remains the same irrespective of the signalization 34. In case of the current frame being of the one or long transform type, the indices 0 to N−1 correspond to the ordering of the frequency-domain coefficients 24 from the lower frequency to the highest frequency, and in case of the current frame being of the split transform type, the indices correspond to the order to the frequency-domain coefficients when spectrally arranged according to their spectral order, but in an interleaved manner so that every second frequency-domain coefficient 24 belongs to the trailing transform, whereas the others belong to the leading transform.

Similar facts hold true for the scale factors 32. As the scale factor extractor 14 operates in a manner agnostic with respect to signalization 34, the number and order as well as the values of scale factors 32 arriving from scale factor extractor 14 is independent from the signalization 34, with the scale factors 32 in FIG. 2 being exemplarily denoted as $S_0$ to $S_M$ with the index corresponding to the sequential order among the scale factor bands with which these scale factors are associated.

In a manner similar to frequency-domain coefficient extractor 12 and scale factor extractor 14, the de-quantizer 36 may operate agnostically with respect to, or independently from, signalization 34. De-quantizer 36 de-quantizes, or scales, the inbound frequency-domain coefficients 24 using the scale factor associated with the scale factor band to which the respective frequency-domain coefficients belong. Again, the membership of the inbound frequency-domain coefficients 24 to the individual scale factor bands, and thus the association of the inbound frequency-domain coefficients 24 to the scale factors 32, is independent from the signalization 34, and the inverse transformer 16 thus subjects the frequency-domain coefficients 24 to scaling according to the scale factors 32 at a spectral resolution which is independent from the signalization. For example, de-quantizer 36, independent from signalization 34, assigns frequency-domain coefficients with indices 0 to 3 to the first scale factor band and accordingly the first scale factor $S_0$, the frequency-domain coefficients with indices 4 to 9 to the second scale factor band and thus scale factor $S_1$ and so forth. The scale factor bounds are merely meant to be illustrative. The de-quantizer 36 could, for example, in order to de-quantize the frequency-domain coefficients 24 perform a multiplication using the associated scale factor, i.e. compute frequency-domain coefficient $x_0$ to be $x_0 \cdot s_0$, $x_1$ to be $x_1 \cdot s_0$, . . . , $x_3$ to be $x_3 \cdot s_0$, $x_4$ to be $x_4 \cdot s_1$, . . . , $x_9$ to be $x_9 \cdot s_1$, and so on. Alternatively, the de-quantizer 36 may perform an interpolation of the scale factors actually used for de-quantization of the frequency-domain coefficients 24 from the coarse spectral resolution defined by the scale factor bands. The interpolation may be independent from the signalization 34. Alternatively, however, the latter interpolation may be dependent on the signalization in order to account for the different spectro-temporal sampling positions of the frequency-domain coefficients 24 depending on the current frame being of the split transform type or one/long transform type.

FIG. 2 illustrates that up to the input side of activatable de-interleaver 38, the order among the frequency-domain coefficients 24 remains the same and the same applies, at least substantially, with respect to the overall operation up to that point. FIG. 2 shows that upstream of activatable de-interleaver 38, further operations may be performed by the inverse transformer 16. For example, inverse transformer 16 could be configured to perform noise filling onto the frequency-domain coefficients 24. For example, in the sequence of frequency-domain coefficients 24 scale factor bands, i.e. groups of inbound frequency-domain coefficients in the order following indices 0 to N−1, could be identified, where all frequency-domain coefficients 24 of the respective scale factor bands are quantized to zero. Such frequency-domain coefficients could be filled, for example, using artificial noise generation such as, for example, using a pseudorandom number generator. The strength/level of the noise filled into a zero-quantized scale factor band could be adjusted using the scale factor of the respective scale factor band as same is not needed for scaling since the spectral coefficients therein are all zero. Such a noise filling is shown in FIG. 2 at 40 and described in more detail in an embodiment in patent EP2304719A1 [6].

FIG. 2 shows further that inverse transformer 16 may be configured to support joint-stereo coding and/or inter-channel stereo prediction. In the framework of inter-channel stereo prediction, the inverse transformer 16 could, for example, predict 42 the spectrum in the non-de-interleaved arrangement represented by the order of indices 0 to N−1 from another channel of the audio signal. That is, it could be that the frequency-domain coefficients 24 describe the spectrogram of a channel of a stereo audio signal, and that the inverse transformer 16 is configured to treat the frequency-domain coefficients 24 as a prediction residual of a prediction signal derived from the other channel of this stereo audio signal. This inter-channel stereo prediction could be, for example, performed at some spectral granularity independent from signalization 34. The complex prediction parameters 44 controlling the complex stereo prediction 42 could for example activate the complex stereo prediction 42 for certain ones of the aforementioned scale factor bands. For each scale factor band for which complex prediction is activated by way of the complex prediction parameter 44, the scaled frequency-domain coefficients 24, arranged in the order of 0 to N−1, residing within the respective scale factor band, would be summed-up with the inter-channel prediction signal obtained from the other channel of the stereo audio signal. A complex factor contained within the complex prediction parameters 44 for this respective scale factor band could control the prediction signal.

Further, within the joint-stereo coding framework, the inverse transformer 16 could be configured to perform MS decoding 46. That is, decoder 10 of FIG. 1 could perform the operations described so far twice, once for a first channel and another time for a second channel of a stereo audio signal, and controlled via MS parameters within the data stream 20, the inverse transformer 16 could MS decode these two channels or leave them as they are, namely as left and right channels of the stereo audio signal. The MS parameters 48 could switch between MS coding on a frame level or even at some finer level such as in units of scale factor bands or groups thereof. In case of activated MS decoding, for example, the inverse transformer 16 could form a sum of the corresponding frequency-domain coefficients 24 in the coefficients' order 0 to N−1, with corresponding frequency-domain coefficients of the other channel of the stereo audio signal, or a difference thereof.

FIG. 2 then shows that the activatable de-interleaver 38 is responsive to the signalization 34 for the current frame in order to, in case of the current frame being signaled by signalization 34 to be a split transform frame, de-interleave the inbound frequency-domain coefficients so as to obtain two transforms, namely a leading transform 50 and a trailing transform 52, and to leave the frequency-domain coefficients interleaved so as to result in one transform 54 in case of the signalization 34 indicating the current frame to be a long transform frame. In case of de-interleaving, de-interleaver 38 forms one transform out of 50 and 52, a first short transform out of the frequency-domain coefficients having even indices, and the other short transform out of the frequency-domain coefficients at the uneven index positions. For example, the frequency-domain coefficients of even index could form the leading transform (when starting at index 0), whereas the others form the trailing transform. Transforms 50 and 52 are subject to inverse transformation of shorter transform length resulting in time-domain portions 56 and 58, respectively. Combiner 18 of FIG. 1 correctly positions time-domain portions 56 and 58 in time, namely the time-domain portion 56 resulting from the leading transform 50 in front of the time-domain portion 58 resulting from the trailing transform 52, and performs the overlap-and-add process there-between and with time-domain portions resulting from preceding and succeeding frames of the audio signal. In case of non-de-interleaving, the frequency-domain coefficients arriving at the interleaver 38 constitute the long transform 54 as they are, and inverse transformation stage 40 performs an inverse transform thereon so as to result in a time-domain portion 60 spanning over, and beyond, the current frame's 26 whole time interval. The combiner 18 combines the time-domain portion 60 with respective time-domain portions resulting from preceding and succeeding frames of the audio signal.

The frequency-domain audio decoder described so far enables transform length switching in a manner which allows to be compatible with frequency-domain audio decoders which are not responsive to signalization 34. In particular, such "old fashioned" decoders would erroneously assume that frames which are actually signaled by signalization 34 to be of the split transform type, to be of the long transform type. That is, they would erroneously leave the split-type frequency-domain coefficients interleaved and perform an inverse transformation of the long transform length. However, the resulting quality of the affected frames of the reconstructed audio signal would still be quite reasonable.

The coding efficiency penalty, in turn, is still quite reasonable, too. The coding efficiency penalty results from the disregarding signalization 34 as the frequency-domain coefficients and scale factors are encoded without taking into account the varying coefficients' meaning and exploiting this variation so as to increase coding efficiency. However, the latter penalty is comparatively small compared to the advantage of allowing backward compatibility. The latter statement is also true with respect to the restriction to activate and deactivate noise filler 40, complex stereo prediction 42 and MS decoding 46 merely within continuous spectral portions (scale factor bands) in the de-interleaved state defined by indices 0 to N−1 in FIG. 2. The opportunity to render control these coding tools specifically for the type of frame (e.g. having two noise levels) could possibly provide advantages, but the advantages are overcompensated by the advantage of having backward compatibility.

FIG. 2 shows that the decoder of FIG. 1 could even be configured to support TNS coding while nevertheless keeping the backward compatibility with decoders being insensitive for signalization 34. In particular, FIG. 2 illustrates the possibility of performing inverse TNS filtering after any complex stereo prediction 42 and MS decoding 46, if any. In order to maintain backward compatibility, the inverse transformer 16 is configured to perform inverse TNS filtering 62 onto a sequence of N coefficients irrespective of signalization 34 using respective TNS coefficients 64. By this measure, the data stream 20 codes the TNS coefficients 64 equally, irrespective of signalization 34. That is, the number of TNS coefficients and the way of coding same is the same. However, the inverse transformer 16 is configured to differently apply the TNS coefficients 64. In case of the current frame being a long transform frame, inverse TNS filtering is performed onto the long transform 54, i.e. the frequency-domain coefficients sequentialized in the interleaved state, and in case of the current frame being signaled by signalization 34 as a split transform frame, inverse transformer 16 inverse TNS filters 62 a concatenation of leading transform 50 and trailing transform 52, i.e. the sequence of frequency-domain coefficients of indices 0, 2, . . . , N−2, 1, 3, 5, . . . , N−1. Inverse TNS filtering 62 may, for example, involve inverse transformer 16 applying a filter, the transfer function of which is set according to the TNS coefficients 64 onto the de-interleaved or interleaved sequence of coefficients having passed the sequence of processing upstream de-interleaver 38.

Thus, an "old fashioned" decoder which accidentally treats frames of the split transform type as long transform frames, applies TNS coefficients 64 which have been generated by an encoder by analyzing a concatenation of two short transforms, namely 50 and 52, onto transform 54 and accordingly produces, by way of the inverse transform applied onto transform 54, an incorrect time-domain portion 60. However, even this quality degradation at such decoders might be endurable for listeners in case of restricting the use of such split transform frames to occasions where the signal represents rain or applause or the like.

Figure 3:
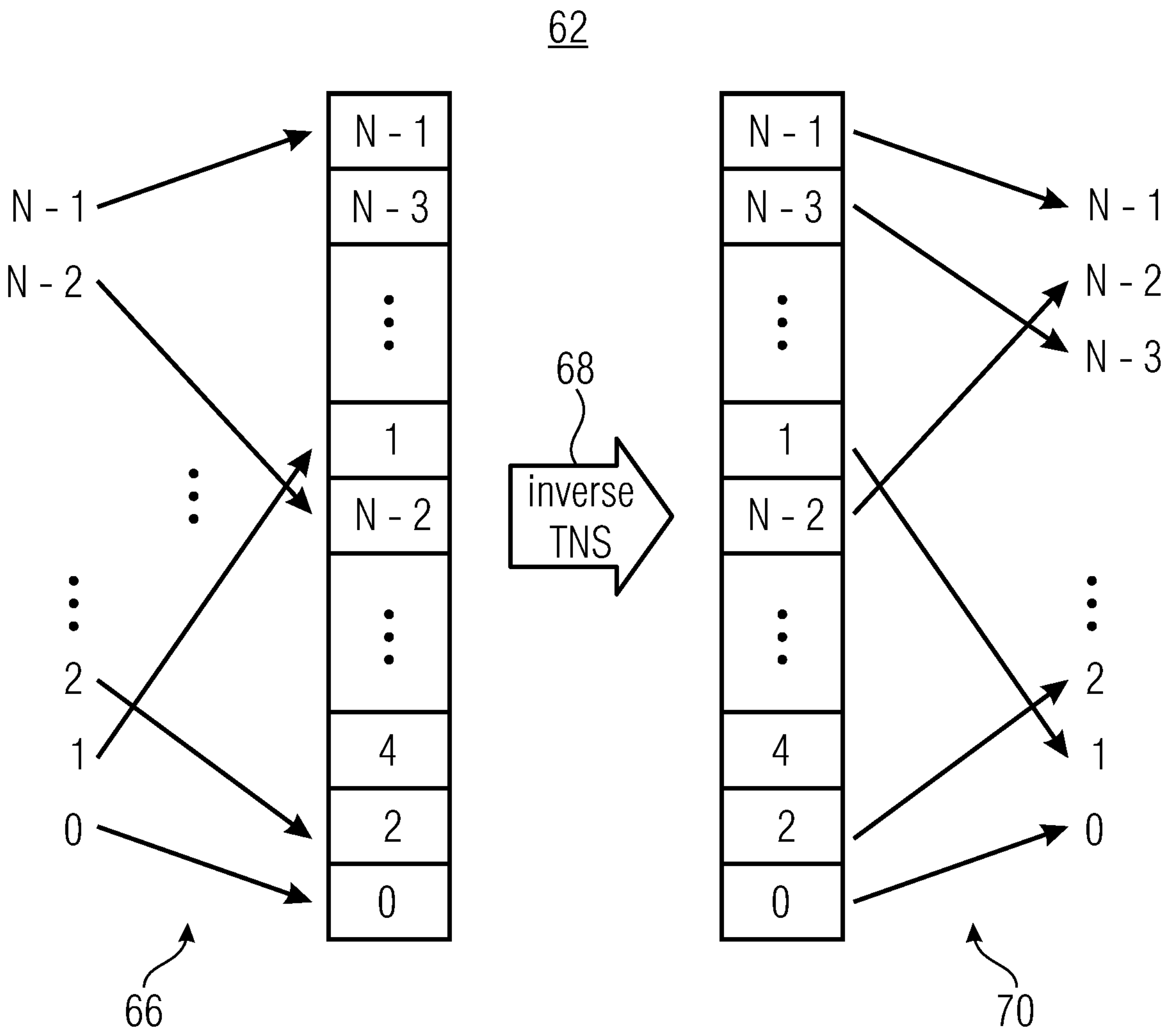
FIG. 3 shows a schematic illustrating a possible displacement of the inverse TNS filtering process of FIG. 2 towards an upstream direction in accordance with an embodiment.

For the sake of completeness, FIG. 3 shows that inverse TNS filtering 62 of inverse transformer 16 may also be inserted elsewhere into the sequence of processing shown in FIG. 2. For example, the inverse TNS filtering 62 could be positioned upstream the complex stereo prediction 42. In order to keep the de-interleaved domain downstream and upstream the inverse TNS filtering 62, FIG. 3 shows that in that case the frequency domain coefficients 24 are merely preliminarily de-interleaved 66, in order to perform the inverse TNS filtering 68 within the de-interleaved concatenated state where the frequency-domain coefficients 24 as processed so far are in the order of indices 0, 2, 4, . . . , N−2, 1, 3, . . . , N−3, N−1, whereupon the de-interleaving is reversed 70 so as to obtain the frequency-domain coefficients in the inversely TNS filtered version in their interleaved order 0, 1, 2, . . . , N−1 again. The position of the inverse TNS filtering 62 within the sequence of processing steps shown in FIG. 2 could be fixed or could be signaled via the data stream 20 such as, for example, on a frame by frame basis or at some other granularity.

It should be noted that, for sake of alleviating the description, the above embodiments concentrated on the juxtaposition of long transform frames and split transform frames only. However, embodiments of the present application may well be extended by the introduction of frames of other transform type such as frames of eight short transforms. In this regard, it should be noted that the afore-mentioned agnosticism, merely relates to frames distinguished, by way of a further signalization, from such other frames of any third transform type so that an "old fashioned" decoder, by inspecting the further signalization contained in all frames, accidentally treats split transform frames as long transform frames, and merely the frames distinguished from the other frames (all except for split transform and long transform frames) would comprise signalization 34. As far as such other frames (all except for split transform and long transform frames) are concerned, it is noted that the extractors' 12 and 14 mode of operation such as context selection and so forth could depend on the further signalization, that is, said mode of operation could be different from the mode of operation applied for split transform and long transform frames.

Before describing a suitable encoder fitting to the decoder embodiments described above, an implementation of the above embodiments is described which would be suitable for accordingly upgrading xHE-AAC-based audio coders/decoders to allow the support of transform splitting in a backward-compatible manner.

That is, in the following a possibility is described how to perform transform length splitting in an audio codec which is based on MPEG-D xHE-AAC (USAC) with the objective of improving the coding quality of certain audio signals at low bit rates. The transform splitting tool is signaled semi-backward compatibly such that legacy xHE-AAC decoders can parse and decode bitstreams according to the above embodiments without obvious audio errors or drop-outs. As will be shown hereinafter, this semi-backward compatible signalization exploits unused possible values of a frame syntax element controlling, in a conditionally coded manner, the usage of noise filling. While legacy xHE-AAC decoders are not sensitive for these possible values of the respective noise filling syntax element, enhanced audio decoders are.

In particular, the implementation described below enables, in line with the embodiments described above, to offer an intermediate transform length for coding signals similar to rain or applause, advantageously a split long block, i.e. two sequential transforms, each of half or a quarter of the spectral length of a long block, with a maximum time overlap between these transforms being less than a maximum temporal overlap between consecutive long blocks. To allow coded bitstreams with transform splitting, i.e. signalization 34, to be read and parsed by legacy xHE-AAC decoders, splitting should be used in a semi-backward compatible way: the presence of such a transform splitting tool should not cause legacy decoders to stop—or not even start—decoding. Readability of such bitstreams by xHE-AAC infrastructure can also facilitate market adoption. To achieve the just mentioned objective of semi-backward compatibility for using transform splitting in the context of xHE-AAC or its potential derivatives, a transform splitting is signaled via the noise filling signalization of xHE-AAC. In compliance with the embodiments described above, in order to build transform splitting into xHE-AAC coders/ decoders, instead of a frequency-domain (FD) stop-start window sequence a split transform consisting of two separate, half-length transforms may be used. The temporally sequential half-length transforms are interleaved into a single stop-start like block in a coefficient-by-coefficient fashion for decoders which do not support transform splitting, i.e. legacy xHE-AAC decoders. The signaling via noise filling signalization is performed as described hereafter. In particular, the 8-bit noise filling side information may be used to convey transform splitting. This is feasible because the MPEG-D standard [4] states that all 8 bits are transmitted even if the noise level to be applied is zero. In that situation, some of the noise-fill bits can be reused for transform splitting, i.e. for signalization 34.

Semi-backward compatibility regarding bitstream parsing and playback by legacy xHE-AAC decoders may be ensured as follows. Transform splitting is signaled via a noise level of zero, i.e. the first three noise-fill bits all having a value of zero, followed by five non-zero bits (which traditionally represent a noise offset) containing side information concerning the transform splitting as well as the missing noise level. Since a legacy xHE-AAC decoder disregards the value of the 5-bit offset if the 3-bit noise level is zero, the presence of transform splitting signalization 34 only has an effect on the noise filling in the legacy decoder: noise filling is turned off since the first three bits are zero, and the remainder of the decoding operation runs as intended. In particular, a split transform is processed like a traditional stop-start block with a full-length inverse transform (due to the above mentioned coefficient interleaving) and no de-interleaving is performed. Hence, a legacy decoder still offers "graceful" decoding of the enhanced data stream/bitstream 20 because it does not need to mute the output signal 22 or even abort the decoding upon reaching a frame of the transform splitting type. Naturally, such a legacy decoder is unable to provide a correct reconstruction of split transform frames, leading to deteriorated quality in affected frames in comparison with decoding by an appropriate decoder in accordance with FIG. 1, for instance. Nonetheless, assuming the transform splitting is used as intended, i.e. only on transient or noisy input at low bitrates, the quality through an xHE-AAC decoder should be better than if the affected frames would drop out due to muting or otherwise lead to obvious playback errors.

Concretely, an extension of an xHE-AAC coder/decoder towards transform splitting could be as follows.

In accordance with the above description, the new tool to be used for xHE-AAC could be called transform splitting (TS). It would be a new tool in the frequency-domain (FD) coder of xHE-AAC or, for example, MPEG-H 3D-Audio being based on USAC [4]. Transform splitting would then be usable on certain transient signal passages as an alternative to regular long transforms (which lead to time-smearing, especially pre-echo, at low bitrates) or eight-short transforms (which lead to spectral holes and bubble artifacts at low bitrates). TS might then be signaled semi-backward-compatibly by FD coefficient interleaving into a long transform which can be parsed correctly by a legacy MPEG-D USAC decoder.

A description of this tool would be similar to the above description. When TS is active in a long transform, two half-length MDCTs are employed instead of one full-length MDCT, and the coefficients of the two MDCTs, i.e. 50 and 52, are transmitted in a line-by-line interleaved fashion. The interleaved transmission had already been used, for example, in case of FD (stop) start transforms, with the coefficients of the first-in-time MDCT placed at even and the coefficients of the second-in-time MDCT placed at odd indices (where the indexing begins at zero), but a decoder not being able to handle stop-start transforms would not have been able to correctly parse the data stream. That is, owing to different contexts used for entropy coding the frequency-domain coefficients serve such a stop-start transform, a varied syntax streamlined onto the halved transforms, any decoder not able to support stop-start windows would have had to disregard the respective stop-start window frames.

Briefly referring back to the embodiment described above, this means that the decoder of FIG. 1 could be, beyond the description brought forward so far, be able to alternatively support further transform length, i.e. a subdivision of certain frames 26 into even more than two transforms using a signalization which extends signalization 34. With regard to the juxtaposition of transform subdivisions of frames 26, other than the split transform activated using signalization 34, however, FD coefficient extractor 12 and scaling factor extractor 14 would be sensitive to this signalization in that their mode of operation would change in dependence on that extra signalization in addition to signalization 34. Further, a streamlined transmission of TNS coefficients, MS parameters and complex prediction parameters, tailored to the signaled transform type other than the split transform type according to 56 and 59, would necessitate that each decoder has to be able to be responsive to, i.e. understand, the signalization selecting between these "known transform types" or frames including the long transform type according to 60, and other transform types such as one subdividing frames into eight short transforms as in case of AAC, for example. In that case, this "known signalization" would identify frames for which signalization 34 signals the split transform type, as frames of the long transform type so that decoders not able to understand signalization 34, treat these frames as long transform frames rather than frames of other types, such as 8-short-transform type frames.

Back again to the description of a possible extension of xHE-AAC, certain operational constraints could be provided in order to build a TS tool into this coding framework. For example, TS could be allowed to be used only in an FD long-start or stop-start window. That is, the underlying syntax-element window sequence could be requested to be equal to 1. Besides, due to the semi-backward-compatible signaling, it may be a requirement that TS can only be applied when the syntax element noiseFilling is one in the syntax container UsacCoreConfig( ). When TS is signaled to be active, all FD tools except for TNS and inverse MDCT operate on the interleaved (long) set of TS coefficients. This allows for the reuse of the scale factor band offset and long-transform arithmetic coder tables as well as the window shapes and overlap lengths.

In the following, terms and definitions are presented which are used in the following in order to explain as to how the USAC standard described in [4] could be extended to offer the backward-compatible TS functionality, wherein sometimes reference is made to sections within that standard for the interested reader.

A new data element could be:

split_transform binary flag indicating whether TS is utilized in the current frame and channel New help elements could be:

window_sequence FD window sequence type for the current frame and channel (section 6.2.9)

noise_offset noise-fill offset to modify scale factors of zero-quantized bands (section 7.2)

noise_level noise-fill level representing amplitude of added spectrum noise (section 7.2)

half_transform_length one half of coreCoderFrameLength (ccfl, the transform length, section 6.1.1)

half_lowpass_line one half of the number of MDCT lines transmitted for the current channel.

The decoding of an FD (stop-) start transform using transform splitting (TS) in the USAC framework could be performed on purely sequential steps as follows:

First, a decoding of split_transform and half_lowpass_line could be performed.

split_transform actually would not represent an independent bit-stream element but is derived from the noise filling elements, noise_offset and noise_level, and in case of a UsacChannelPairElement( ), the common_window flag in StereoCoreToolInfo( ). If noiseFilling==0, split_transform is 0. Otherwise,

```
if ((noiseFilling != 0) && (noise_level == 0)) {
split_transform = (noise_offset & 16) / 16;
noise_level = (noise_offset & 14) / 2;
noise_offset = (noise_offset & 1) * 16;
}
else {
split_transform = 0;
}
```

In other words, if noise_level==0, noise_offset contains the split_transform flag followed by 4 bit of noise filling data, which are then rearranged. Since this operation changes the values of noise_level and noise_offset, it has to be executed before the noise filling process of section 7.2. Furthermore, if common_window==1 in a UsacChannelPairElement( ), split_transform is determined only in the left (first) channel; the right channel's split_transform is set equal to (i.e. copied from) the left channel's split_transform, and the above pseudo-code is not executed in the right channel.

```
half_lowpass_line is determined from the "long" scale factor band
offset table, swb_offset_long_window, and the max_sfb of the current
channel, or in case of stereo and common_window == 1, max_sfb_ste.
                max_sfb_ste in elements with StereoCoreToolInfo( )
                and common_window == 1,
lowpass_sfb =
                max_sfb otherwise. Based on the igFilling flag,
                half_lowpass_line is derived:
if (igFilling != 0) {
lowpass_sfb = max(lowpass_sfb, ig_stop_sfb);
}
half_lowpass_line = swb_offset_long_window[lowpass_sfb] / 2;
```

Then, as a second step, de-interleaving of half-length spectra for temporal noise shaping would be performed.

After spectrum de-quantization, noise filling, and scale factor application and prior to the application of Temporal Noise Shaping (TNS), the TS coefficients in spec[ ] are de-interleaved using a helper buffer[ ]:

```
for (i = 0, i2 = 0; i < half_lowpass_line; i += 1, i2 += 2) {
spec[i] = spec[i2];              /* isolate 1st window */
buffer[i] = spec[i2+1];          /* isolate 2nd window */
}
for (i = 0; i < half_lowpass_line; i += 1) {
spec[i+half_lowpass_line] = buffer[i]; /* copy 2nd window */
}
```

The in-place de-interleaving effectively places the two half-length TS spectra on top of each other, and the TNS tool now operates as usual on the resulting full-length pseudo-spectrum.

Referring to the above, such a procedure has been described with respect to FIG. 3.

Then, as the third step, temporary reinterleaving would be used along with two sequential inverse MDCTs.

If common_window==1 in the current frame or the stereo decoding is performed after TNS decoding (tns_on_lr==0 in section 7.8), spec[ ] has to be re-interleaved temporarily into a full-length spectrum:

```
for (i = 0; i < half_lowpass_line; i += 1) {
buffer[i] = spec[i];                          /* copy 1st window */
}
for (i = 0, i2 = 0; i < half_lowpass_line; i += 1, i2 += 2) {
spec[i2] = buffer[i];                         /* merge 1st window */
spec[i2+1] = spec[i+half_lowpass_line];       /* merge 2nd window */
}
```

The resulting pseudo-spectrum is used for stereo decoding (section 7.7) and to update dmx_re_prev[ ]

(sections 7.7.2 and A.1.4). In case of tns_on_lr==0, the stereo-decoded full-length spectra are again de-interleaved by repeating the process of section A.1.3.2. Finally, the 2 inverse MDCTs are calculated with ccfl and the channel's window_shape of the current and last frame. See section 7.9 and FIG. 1.

Some modification may be made to complex predictions stereo decoding of xHE-AAC.

An implicit semi-backward compatible signaling method may alternatively be used in order to build TS into xHE-AAC.

The above described an approach which employs one bit in a bit-stream to signal usage of the inventive transform splitting, contained in split_transform, to an inventive decoder. In particular, such signaling (let's call it explicit semi-backward-compatible signaling) allows the following legacy bitstream data—here the noise filling side-information—to be used independently of the inventive signal: In the present embodiment, the noise filling data does not depend on the transform splitting data, and vice versa. For example, noise filling data consisting of all-zeros (noise_level=noise_offset=0) may be transmitted while split_transform may hold any possible value (being a binary flag, either 0 or 1).

In cases where such strict independence between the legacy and the inventive bit-stream data is not necessitated and the inventive signal is a binary decision, the explicit transmission of a signaling bit can be avoided, and said binary decision can be signaled by the presence or absence of what may be called implicit semi-backward-compatible signaling. Taking again the above embodiment as an example, the usage of transform splitting could be transmitted by simply using the inventive signaling: If noise_level is zero and, at the same time, noise_offset is not zero, then split_transform is set equal to 1. If both noise_level and noise_offset are not zero, split_transform is set equal to 0. A dependence of the inventive implicit signal on the legacy noise-fill signal arises when both noise_level and noise_offset are zero. In this case, it is unclear whether legacy or inventive implicit signaling is being used. To avoid such ambiguity, the value of split_transform has to be defined in advance. In the present example, it is appropriate to define split_transform=0 if the noise filling data consists of all-zeros, since this is what legacy encoders without transform splitting shall signal when noise filling is not to be used in a frame.

The issue which remains to be solved in case of implicit semi-backward-compatible signaling is how to signal split_transform==1 and no noise filling at the same time. As explained, the noise-fill data do not have to be all-zero, and if a noise magnitude of zero is requested, noise_level ((noise_offset & 14)/2 as above) has to equal 0. This leaves only a noise_offset ((noise_offset & 1)*16 as above) greater than 0 as a solution. Fortunately, the value of noise_offset is ignored if no noise filling is performed in a decoder based on USAC [4], so this approach turns out to be feasible in the present embodiment. Therefore, the signaling of split_transform in the pseudo-code as above could be modified as follows, using the saved TS signaling bit to transmit 2 bits (4 values) instead of 1 bit for noise_offset:

```
if ((noiseFilling != 0) && (noise_level == 0) && (noise_offset != 0)) {
split_transform = 1;
noise_level = (noise_offset & 28) / 4;
noise_offset = (noise_offset & 3) * 8;
}
else {
split_transform = 0;
}
```

Accordingly, applying this alternative, the description of USAC could be extended using the following description.

The tool description would be largely the same. That is,

When Transform splitting (TS) is active in a long transform, two half-length MDCTs are employed instead of one full-length MDCT. The coefficients of the two MDCTs are transmitted in a line-by-line interleaved fashion as a traditional frequency domain (FD) transform, with the coefficients of the first-in-time MDCT placed at even and the coefficients of the second-in-time MDCT placed at odd indices.

Operational constraints could necessitate that TS can only be used in a FD long-start or stop-start window (window_sequence==1) and that TS can only be applied when noiseFilling is 1 in UsacCoreConfig( ). When TS is signaled, all FD tools except for TNS and inverse MDCT operate on the interleaved (long) set of TS coefficients. This allows the reuse of the scale factor band offset and long-transform arithmetic coder tables as well as the window shapes and overlap lengths.

Terms and definitions used hereinafter involve the following Help Elements common_window indicates if channel 0 and channel 1 of a CPE use identical window parameters (see ISO/IEC 23003-3:2012 section 6.2.5.1.1).

window_sequence FD window sequence type for the current frame and channel (see ISO/IEC 23003-3:2012 section 6.2.9).

tns_on_lr Indicates the mode of operation for TNS filtering (see ISO/IEC 23003-3:2012 section 7.8.2).

noiseFilling This flag signals the usage of the noise filling of spectral holes in the FD core coder (see ISO/IEC 23003-3:2012 section 6.1.1.1).

noise_offset noise-fill offset to modify scale factors of zero-quantized bands (see ISO/IEC 23003-3:2012 section 7.2).

noise_level noise-fill level representing amplitude of added spectrum noise (see ISO/IEC 23003-3:2012 section 7.2).

split_transform binary flag indicating whether TS is utilized in the current frame and channel.

half_transform_length one half of coreCoderFrameLength (ccfl, the transform length, see ISO/IEC 23003-3:2012 section 6.1.1).

half_lowpass_line one half of the number of MDCT lines transmitted for the current channel.

The decoding process involving TS could be described as follows. In particular, the decoding of an FD (stop-)start transform with TS is performed in three sequential steps as follows.

First, decoding of split_transform and half_lowpass_line is performed. The help element split_transform does not represent an independent bit-stream element but is derived from the noise filling elements, noise_offset and noise_level, and in case of a UsacChannelPairElement( ), the common_window flag in StereoCoreToolInfo( ). If noiseFilling==0, split_transform is 0. Otherwise,

```
if ((noiseFilling != 0) && (noise_level == 0)) {
split_transform = 1;
noise_level = (noise_offset & 28) / 4;
noise_offset = (noise_offset & 3) * 8;
}
else {
  split_transform = 0;
}
```

In other words, if noise_level==0, noise_offset contains the split_transform flag followed by 4 bit of noise filling data, which are then rearranged. Since this operation changes the values of noise_level and noise_offset, it has to be executed before the noise filling process of ISO/IEC 23003-3:2012 section 7.2.

Furthermore, if common_window==1 in a UsacChannelPairElement( ), split_transform is determined only in the left (first) channel; the right channel's split_transform is set equal to (i.e. copied from) the left channel's split_transform, and the above pseudo-code is not executed in the right channel.

The help element half_lowpass_line is determined from the "long" scale factor band offset table, swb_offset_long_window, and the max_sfb of the current channel, or in case of stereo and common_window==1, max_sfb_ste.

$$\text{lowpass\_sfb} = \begin{cases} \text{max\_sfb\_ste} & \text{in elements with } \textit{StereoCoreToolInfo}() \text{ and common\_window} = 1, \\ \text{max\_sfb} & \text{otherwise} \end{cases}.$$

Based on the igFilling flag, half_lowpass_line is derived:

```
if (igFilling != 0) {
  lowpass_sfb = max(lowpass_sfb, ig_stop_sfb);
}
half_lowpass_line = swb_offset_long_window[lowpass_sfb] / 2;
```

Then, de-interleaving of the half-length spectra for temporal noise shaping is performed.

After spectrum de-quantization, noise filling, and scale factor application and prior to the application of Temporal Noise Shaping (TNS), the TS coefficients in spec[ ] are de-interleaved using a helper buffer[ ]:

```
for (i = 0, i2 = 0; i < half_lowpass_line; i += 1, i2 += 2) {
  spec[i] = spec[i2];   /* isolate 1st window */
  buffer[i] = spec[i2+1];          /* isolate 2nd window */
}
for (i = 0; i < half_lowpass_line; i += 1) {
  spec[i+half_lowpass_line] = buffer[i];        /* copy 2nd window */
}
```

The in-place de-interleaving effectively places the two half-length TS spectra on top of each other, and the TNS tool now operates as usual on the resulting full-length pseudo-spectrum.

Finally, temporary re-interleaving and two sequential Inverse MDCTs may be used:

If common_window==1 in the current frame or the stereo decoding is performed after TNS decoding (tns_on_lr==0 in section 7.8), spec[ ] has to be re-interleaved temporarily into a full-length spectrum:

```
for (i = 0; i < half_lowpass_line; i += 1) {
  buffer[i] = spec[i];      /* copy 1st window */
}
for (i = 0, i2 = 0; i < half_lowpass_line; i += 1, i2 += 2) {
  spec[i2] = buffer[i]; /* merge 1st window */
  spec[i2+1] = spec[i+half_lowpass_line];       /* merge 2nd window */
}
```

The resulting pseudo-spectrum is used for stereo decoding (ISO/IEC 23003-3:2012 section 7.7) and to update dmx_re_prev[ ] (ISO/IEC 23003-3:2012 section 7.7.2) and in case of tns_on_lr==0, the stereo-decoded full-length spectra are again de-interleaved by repeating the process of section. Finally, the 2 inverse MDCTs are calculated with ccfl and the channel's window_shape of the current and last frame.

The processing for TS follows the description given in ISO/IEC 23003-3:2012 section "7.9 Filterbank and block switching". The following additions should be taken into account.

The TS coefficients in spec[ ] are de-interleaved using a helper buffer[ ] with N, the window length based on the window_sequence value:

```
for (i = 0, i2 = 0; i < N/2; i += 1, i2 += 2) {
  spec[0][i] = spec[i2];        /* isolate 1st window */
  buffer[i] = spec[i2+1];       /* isolate 2nd window */
}
for (i = 0; i < N/2; i += 1) {
  spec[1][i] = buffer[i]; /* copy 2nd window */
}
```

The IMDCT for the half-length TS spectrum is then defined as:

$$x_{(0,1),n} = \frac{2}{N}\sum_{k=0}^{\frac{N}{4}-1} spec[(0,1)][k]\cos\left(\frac{4\pi}{N}(n+n_0)\left(k+\frac{1}{2}\right)\right)$$

$$\text{for } 0 \le n < \frac{N}{2}$$

Subsequent windowing and block switching steps are defined in the next subsections.

Transform splitting with STOP_START_SEQUENCE would look like the following description:

A STOP_START_SEQUENCE in combination with transform splitting was depicted in FIG. 2. It comprises two overlapped and added half-length windows 56, 58 with a length of N_l/2 which is 1024 (960, 768). N_s is set to 256 (240, 192) respectively.

The windows (0, 1) for the two half-length IMDCTs are given as follows:

$$W_{(0,1)}(n) = \begin{cases} 0.0, & \text{for } 0 \le n < \frac{N\_l/2 - N\_s}{4} \\ W_{(0,1),LEFT,N\_s}\left(n - \frac{N\_l/2 - N\_s}{4}\right), & \text{for } \frac{N\_l/2 - N\_s}{4} \le n < \frac{N\_l/2 + N\_s}{4} \\ 1.0, & \text{for } \frac{N\_l/2 + N\_s}{4} \le n < \frac{3N\_l/2 - N\_s}{4} \\ W_{(0,1),RIGHT,N\_s}\left(n + \frac{N\_s}{2} - \frac{3N\_l/2 - N\_s}{4}\right), & \text{for } \frac{3N\_l/2 - N\_s}{4} \le n < \frac{3N\_l/2 + N\_s}{4} \\ 0.0, & \text{for } \frac{3N\_l/2 + N\_s}{4} \le n < N\_l/2 \end{cases}$$

where for the first IMDCT the windows $$W_{0,LEFT,N\_s}(n) = \begin{cases} W_{KBD\_LEFT,N\_s}(n), \\ \text{if window\_shape\_previous\_block} == 1 \\ W_{SIN\_LEFT,N\_s}(n), \\ \text{if window\_shape\_previous\_block} == 0 \end{cases},$$

$$W_{0,RIGHT,N\_s}(n) = \begin{cases} W_{KBD\_RIGHT,N\_s}(n), \text{ if window\_shape} == 1 \\ W_{SIN\_RIGHT,N\_s}(n), \text{ if window\_shape} == 0 \end{cases}$$

are applied and for the second *IMDCT* the windows $$W_{1,LEFT,N\_s}(n) = \begin{cases} W_{KBD\_LEFT,N\_s}(n), \text{ if window\_shape} == 1 \\ W_{SIN\_LEFT,N\_s}(n), \text{ if window\_shape} == 0 \end{cases},$$

$$W_{1,RIGHT,N\_s}(n) = \begin{cases} W_{KBD\_RIGHT,N\_s}(n), \text{ if window\_shape} == 1 \\ W_{SIN\_RIGHT,N\_s}(n), \text{ if window\_shape} == 0 \end{cases},$$

are applied.

The overlap and add between the the two half-length windows resulting in the windowed time domain values zi,n is described as follows. Here, N_l is set to 2048 (1920, 1536), N_s to 256 (240, 192) respectively:

$$Z_{i,n}(n) = \begin{cases} 0.0, & \text{for } 0 \le n < N\_s \\ x_{0,n-N\_s} \cdot W_0(n - N\_s), & \text{for } N\_s \le n < \frac{2N\_l - N\_s}{4} \\ x_{0,n-N\_s} \cdot W_0(n - N\_s) + x_{1,n-(N\_l/2-N\_s)} \cdot W_1\left(n - (N\_l/2 - N\_s)\right), & \text{for } \frac{N\_l + N\_s}{4} \le n < \frac{2N\_l + N\_s}{4} \\ x_{1,n-(N\_l/2-N\_s)} \cdot W_1\left(n - (N\_l/2 - N\_s)\right), & \text{for } \frac{2N\_l + N\_s}{4} \le n < N \end{cases}$$

Figure 4:
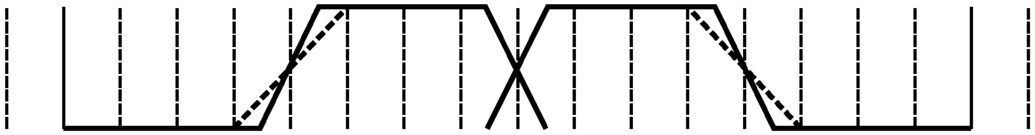
FIG. 4 shows a possibility of selecting windows when using transform splitting for a long stop-start window in USAC in accordance with an embodiment.

Transform Splitting with LONG_START_SEQUENCE would look like the following description:

The LONG_START_SEQUENCE in combination with transform splitting is depicted in FIG. 4. It comprises three windows defined as follows, where N_l/ is set to 1024 (960, 768), N_s is set to 256 (240, 192) respectively.

$$W_0(n) = \begin{cases} 1.0, & \text{for } 0 \le n < \frac{3\mathrm{N\_l}/2 - \mathrm{N\_s}}{4} \\ W_{0,RIGHT,N\_s}\left(n + \frac{\mathrm{N\_s}}{2} - \frac{3\mathrm{N\_l}/2 - \mathrm{N\_s}}{4}\right), & \text{for } \frac{3\mathrm{N\_l}/2 - \mathrm{N\_s}}{4} \le n < \frac{3\mathrm{N\_l}/2 + \mathrm{N\_s}}{4} \\ 0.0, & \text{for } \frac{3\mathrm{N\_l}/2 - \mathrm{N\_s}}{4} \le n < \mathrm{N\_l}/2 \end{cases}$$

$$W_1(n) = \begin{cases} 0.0, & \text{for } 0 \le n < \frac{\mathrm{N\_l}/2 - \mathrm{N\_s}}{4} \\ W_{1,LEFT,N\_s}\left(n - \frac{\mathrm{N\_l}/2 - \mathrm{N\_s}}{4}\right), & \text{for } \frac{\mathrm{N\_l}/2 - \mathrm{N\_s}}{4} \le n < \frac{\mathrm{N\_l}/2 + \mathrm{N\_s}}{4} \\ 1.0, & \text{for } \frac{\mathrm{N\_l}/2 + \mathrm{N\_s}}{4} \le n < \frac{3\mathrm{N\_l}/2 - \mathrm{N\_s}}{4} \\ W_{1,RIGHT,N\_s}\left(n + \frac{\mathrm{N\_s}}{2} - \frac{3\mathrm{N\_l}/2 - \mathrm{N\_s}}{4}\right), & \text{for } \frac{3\mathrm{N\_l}/2 - \mathrm{N\_s}}{4} \le n < \frac{3\mathrm{N\_l}/2 + \mathrm{N\_s}}{4} \\ 0.0, & \text{for } \frac{3\mathrm{N\_l}/2 + \mathrm{N\_s}}{4} \le n < \mathrm{N\_l}/2 \end{cases}$$

The left/right window halves are given by:

$$W_{1,LEFT,N\_s}(n) = \begin{cases} W_{KBD\_LEFT,N\_s}(n), & \text{if window\_shape} == 1 \\ W_{SIN\_LEFT,N\_s}(n), & \text{if window\_shape} == 0 \end{cases},$$

$$W_{(0,1),RIGHT,N\_s}(n) = \begin{cases} W_{KBD\_RIGHT,N\_s}(n), & \text{if window\_shape} == 1 \\ W_{SIN\_RIGHT,N\_s}(n), & \text{if window\_shape} == 0 \end{cases},$$

The third window equals the left half of a LONG-_START_ WINDOW:

$$W_2(n) = \begin{cases} W_{LEFT,N\_l}(n), & \text{for } 0 \le n < \mathrm{N\_l}/2 \\ 1.0, & \text{for } \mathrm{N\_l}/2 \le n < \mathrm{N\_l} \end{cases}$$

$$\text{with } W_{LEFT,N\_l}(n) = \begin{cases} W_{KBD\_LEFT,N\_l}(n), \\ \text{if window\_shape\_previous\_block} == 1 \\ W_{SIN\_LEFT,N\_1}(n), \\ \text{if window\_shape\_previous\_block} == 0 \end{cases}$$

The overlap and add between the the two half-length windows resulting in intermediate windowed time domain values $\tilde{Z}_{i,n}$ is described as follows. Here, N_l is set to 2048 (1920, 1536), N_s to 256 (240, 192) respectively.

$$\tilde{Z}_{i,n}(n) = \begin{cases} -1 \cdot x_{0,2N\_s-n-1} \cdot W_0(2\mathrm{N\_s} - n - 1), & \text{for } 0 \le n < \mathrm{N\_s} \\ x_{0,n-N\_s} \cdot W_0(n - \mathrm{N\_s}), & \text{for } \mathrm{N\_s} \le n < \frac{2\mathrm{N\_l} - \mathrm{N\_s}}{4} \\ x_{0,n-N\_s} \cdot W_0(n - \mathrm{N\_s}) + x_{1,n-(N\_l/2-N\_s)} \cdot W_1(n - (\mathrm{N\_l}/2 - \mathrm{N\_s})), & \text{for } \frac{\mathrm{N\_l} + \mathrm{N\_s}}{4} \le n < \frac{2\mathrm{N\_l} + \mathrm{N\_s}}{4} \\ x_{1,n-(N\_l/2-N\_s)} \cdot W_1(n - (\mathrm{N\_l}/2 - \mathrm{N\_s})), & \text{for } \frac{2\mathrm{N\_l} + \mathrm{N\_s}}{4} \le n < N \end{cases}$$

The final windowed time domain values Zi,n are obtained by applying W2:

$$Z_{i,n}(n) = \tilde{Z}_{i,n}(n) \cdot W_2(n), \text{ for } 0 \le n < N\_l$$

Regardless of whether explicit or implicit semi-backward-compatible signaling is being used, both of which were described above, some modification may be necessitated to the complex prediction stereo decoding of xHE-AAC in order to achieve meaningful operation on the interleaved spectra.

The modification to complex prediction stereo decoding could be implemented as follows.

Since the FD stereo tools operate on an interleaved pseudo-spectrum when TS is active in a channel pair, no changes are necessitated to the underlying M/S or Complex Prediction processing. However, the derivation of the previous frame's downmix dmx_re_prev[ ] and the computation of the downmix MDST dmx_im[ ] in ISO/IEC 23003-3:2012 section 7.7.2 need to be adapted if TS is used in either channel in the last or current frame:

use_prev_frame has to be 0 if the TS activity changed in either channel from last to current frame. In other words, dmx_re_prev[ ] should not be used in that case due to transform length switching.

If TS was or is active, dmx_re_prev[ ] and dmx_re[ ] specify interleaved pseudo-spectra and has to be de-interleaved into their corresponding two half-length TS spectra for correct MDST calculation.

Upon TS activity, 2 half-length MDST downmixes are computed using adapted filter coefficients (Tables 1 and 2) and interleaved into a full-length spectrum dmx_im[ ] (just like dmx_re[ ]).

window_sequence: Downmix MDST estimates are computed for each group window pair. use_prev_frame is evaluated only for the first of the two half-window pairs. For the remaining window pair, the preceding window pair is used in the MDST estimate, which implies use_prev_frame=1.

Window shapes: The MDST estimation parameters for the current window, which are filter coefficients as described below, depend on the shapes of the left and right window halves. For the first window, this means that the filter parameters are a function of the current and previous frames' window_shape flags. The remaining window is only affected by the current window_shape.

TABLE 1

| MDST Filter Parameters for Current Window (filter_coefs) | | |
|---|---|---|
| Current Window Sequence | Left Half: Sine Shape<br>Right Half: Sine Shape | Left Half: KBD Shape<br>Right Half: KBD Shape |
| LONG_START_SEQUENCE<br>STOP_START_SEQUENCE | [0.185618f, −0.000000f, 0.627371f, 0.000000f, −0.627371f, 0.000000f, −0.185618f] | [0.203599f, −0.000000f, 0.633701f, 0.000000f, −0.633701f, 0.000000f, −0.203599f] |
| Current Window Sequence | Left Half: Sine Shape<br>Right Half: KBD Shape | Left Half: KBD Shape<br>Right Half: Sine Shape |
| LONG_START_SEQUENCE<br>STOP_START_SEQUENCE | [0.194609f, 0.006202f, 0.630536f, 0.000000f, −0.630536f, −0.006202f, −0.194609f] | [0.194609f, −0.006202f, 0.630536f, 0.000000f, −0.630536f, 0.006202f, −0.194609f] |

TABLE 2

| MDST Filter Parameters for Previous Window (filter_coefs_prev) | | |
|---|---|---|
| Current Window Sequence | Left Half of Current Window:<br>Sine Shape | Left Half of Current Window:<br>KBD Shape |
| LONG_START_SEQUENCE<br>STOP_START_SEQUENCE | [0.038498, 0.039212, 0.039645, 0.039790, 0.039645, 0.039212, 0.038498] | [0.038498, 0.039212, 0.039645, 0.039790, 0.039645, 0.039212, 0.038498] |

Figure 5:
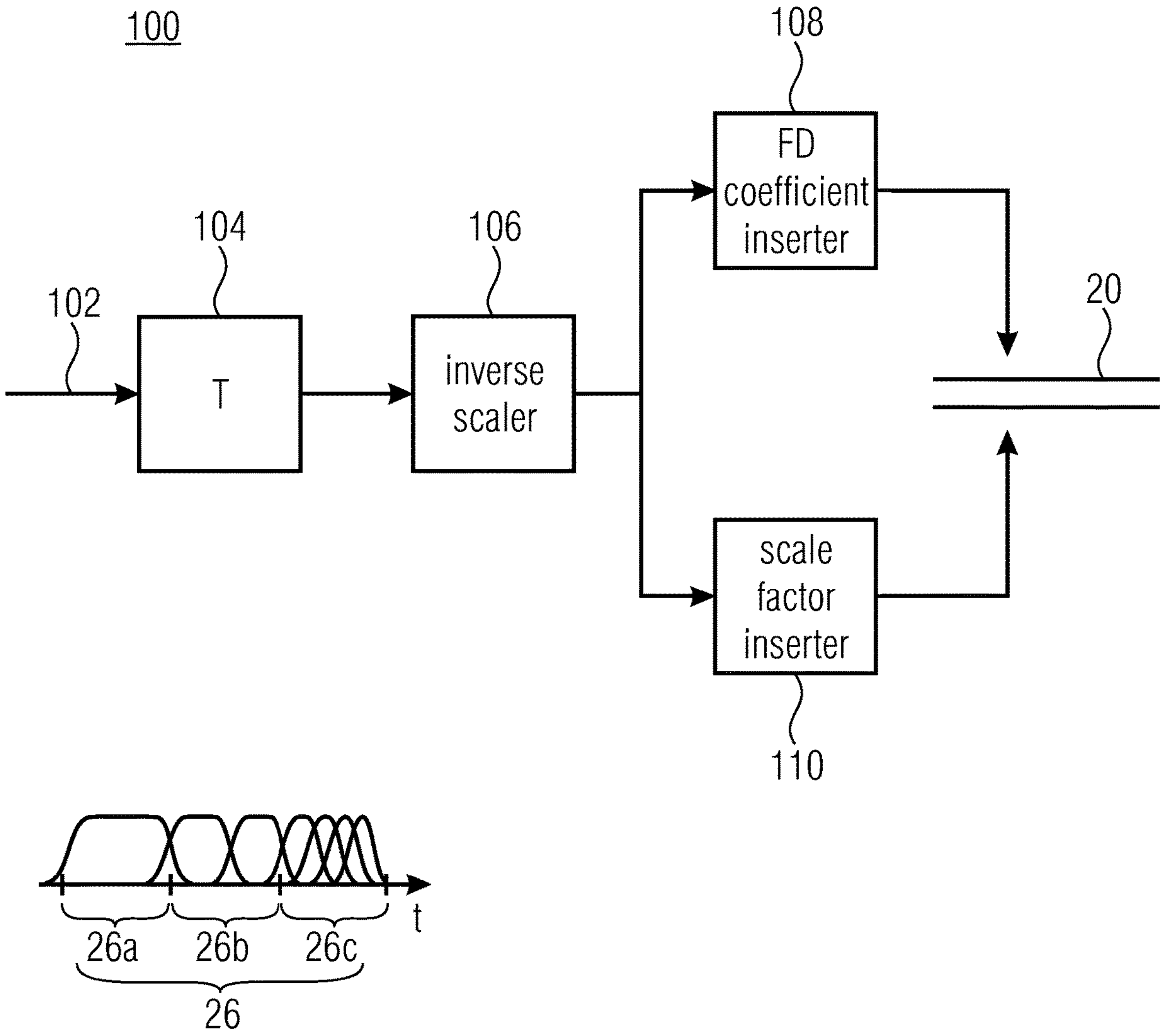
FIG. 5 shows a block diagram of a frequency-domain audio encoder according to an embodiment.

Finally, FIG. 5 shows, for the sake of completeness, a possible frequency-domain audio encoder supporting transform length switching fitting to the embodiments outlined above. That is, the encoder of FIG. 5 which is generally indicated using reference sign 100 is able to encode an audio signal 102 into data stream 20 in a manner so that the decoder of FIG. 1 and the corresponding variants described above are able to take advantage of the transform splitting mode for some of the frames, whereas "old-fashioned" decoders are still able to process TS frames without parsing errors or the like.

The encoder 100 of FIG. 5 comprises a transformer 104, an inverse scaler 106, a frequency-domain coefficient inserter 108 and a scale factor inserter 110. The transformer 104 receives the audio signal 102 to be encoded and is configured to subject time-domain portions of the audio signal to transformation to obtain frequency-domain coefficients for frames of the audio signal. In particular, as became clear from the above discussion, transformer 104 decides on a frame-by-frame basis as to which subdivision of these frames 26 into transforms—or transform windows—is used. As described above, the frames 26 may be of equal length and the transform may be a lapped transform using overlapping transforms of different lengths. FIG. 5 illustrates, for example, that a frame 26*a* is subject to one long transform, a frame 26*b* is subject to transform splitting, i.e. to two transforms of half length, and a further frame 26*c* is shown to be subject to more than two, i.e. $2^n>2$, even shorter transforms of $2^{-n}$ the long transform length. As described above, by this measure, the encoder 100 is able to adapt the spectro-temporal resolution of the spectrogram represented by the lapped transform performed by transformer 104 to the time-varying audio content or kind of audio content of audio signal 102.

That is, frequency-domain coefficients result at the output of transformer 104 representing a spectrogram of audio signal 102. The inverse scaler 106 is connected to the output of transformer 104 and is configured to inversely scale, and concurrently quantize, the frequency-domain coefficients according to scale factors. Notably, the inverse scaler operates on the frequency coefficients as they are obtained by transformer 104. That is, inverse scaler 106 needs to be, necessarily, aware of the transform length assignment or transform mode assignment to frames 26. Note also that the inverse scaler 106 needs to determine the scale factors. Inverse scaler 106 is, to this end, for example, the part of a feedback loop which evaluates a psycho-acoustic masking threshold determined for audio signal 102 so as to keep the quantization noise introduced by the quantization and gradually set according to the scale factors, below the psycho-acoustic threshold of detection as far as possible with or without obeying some bitrate constraint.

At the output of inverse scaler 106, scale factors and inversely scaled and quantized frequency-domain coefficients are output and the scale factor inserter 110 is configured to insert the scale factors into data stream 20, whereas frequency-domain coefficient inserter 108 is configured to insert the frequency-domain coefficients of the frames of the audio signal, inversely scaled and quantized according to the scale factors, into data stream 20. In a manner corresponding to the decoder, both inserters 108 and 110 operate irrespective of the transform mode associated with the frames 26 as far as the juxtaposition of frames 26*a* of the long transform mode and frames 26*b* of the transform splitting mode is concerned.

In other words, inserters 110 and 108 operate independent from the signalization 34 mentioned above which the transformer 104 is configured to signal in, or insert into, data stream 20 for frames 26*a* and 26*b*, respectively.

In other words, in the above embodiment, it is the transformer 104 which appropriately arranges the transform coefficients of long transform and split transform frames, namely by plane serial arrangement or interleaving, and the inserter works really independent from 104. But in a more general sense it suffices if the frequency-domain coefficient inserter's independence from the signalization is restricted to the insertion of a sequence of the frequency-domain coefficients of each long transform and split transform frames of the audio signal, inversely scaled according to scale factors, into the data stream in that, depending on the signalization, the sequence of frequency-domain coefficients is formed by sequentially arranging the frequency-domain coefficients of the one transform of a respective frame in a non-interleaved manner in case of the frame being a long transform frame, and by interleaving the frequency-domain coefficients of the more than one transform of the respective frame in case of the respective frame being a split transform frame.

As far as the frequency-domain coefficient inserter 108 is concerned, the fact that same operates independent from the signalization 34 distinguishing between frames 26*a* on the one hand and frames 26*b* on the other hand, means that inserter 108 inserts the frequency-domain coefficients of the frames of the audio signal, inversely scaled according to the scale factors, into the data stream 20 in a sequential manner in case of one transform performed for the respective frame, in a non-interleaved manner, and inserts the frequency-domain coefficients of the respective frames using interleaving in case of more than one transform performed for the respective frame, namely two in the example of FIG. 5. However, as already denoted above, the transform splitting mode may also be implemented differently so as to split-up the one transform into more than two transforms.

Finally, it should be noted that the encoder of FIG. 5 may also be adapted to perform all the other additional coding measures outlined above with respect to FIG. 2 such as the MS coding, the complex stereo prediction 42 and the TNS with, to this end, determining the respective parameters 44, 48 and 64 thereof.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

A further embodiment comprises a frequency-domain audio decoder supporting transform length switching, comprising

- a frequency-domain coefficient extractor (12) configured to extract frequency-domain coefficients (24) of frames of an audio signal from a data stream;
- a scale factor extractor (14) configured to extract scale factors from the data stream;
- an inverse transformer (16) configured to subject the frequency-domain coefficients of the frames, scaled according to the scale factors, to inverse transformation to obtain time-domain portions of the audio signal;
- a combiner (18) configured to combine the time-domain portions to obtain the audio signal,
- wherein the inverse transformer is responsive to a signalization within the frames of the audio signal so as to, depending on the signalization,
- form one transform by sequentially arranging the frequency-domain coefficients of a respective frame, scaled according to the scale factors, in a non-de-interleaved manner and subject the one transform to an inverse transformation of a first transform length, or
- form more than one transform by de-interleaving the frequency-domain coefficients of the respective frame, scaled according to the scale factors, and subject each of the more than one transforms to an inverse transformation of a second transform length, shorter than the first transform length,
- wherein the frequency-domain coefficient extractor and the scale factor extractor operate independent from the signalization.

A further embodiment comprises a frequency-domain audio decoder as in the immediately preceding embodiment, wherein the scale factor extractor (14) is configured to extract the scale factors from the data stream at a spectro-temporal resolution which is independent from the signalization.

A further embodiment comprises a frequency-domain audio decoder as in any of the two immediately preceding embodiments, wherein the frequency-domain coefficient extractor (12) uses context- or codebook-based entropy decoding to extract the frequency-domain coefficients from the data stream, with assigning, for each frequency-domain coefficient, the same context or codebook to the respective frequency-domain coefficient irrespective of the signalization.

A further embodiment comprises a frequency-domain audio decoder as in any of the three immediately preceding embodiments, wherein the inverse transformer is configured to subject the frequency-domain coefficients to scaling according to the scale factors at a spectral resolution independent from the signalization.

A further embodiment comprises a frequency-domain audio decoder as in any of the four immediately preceding embodiments, wherein the inverse transformer is configured to subject the frequency-domain coefficients to noise filling, with the frequency-domain coefficients sequentially arranged in a non-de-interleaved manner, and at a spectral resolution independent from the signalization.

A further embodiment comprises a frequency-domain audio decoder as in any of the five immediately preceding embodiments, wherein the inverse transformer is configured to in the formation of the one transform, apply inverse temporal noise shaping filtering on the frequency-domain coefficients with the frequency-domain coefficients sequentially arranged in a non-de-interleaved manner, and in the formation of the more than one transforms, apply inverse temporal noise shaping filtering on the frequency-domain coefficients with the frequency-domain coefficients sequentially arranged in a de-interleaved manner according to which the more than one transforms are concatenated spectrally.

A further embodiment comprises a frequency-domain audio decoder as in any of the six immediately preceding embodiments, wherein the inverse transformer is configured to support joint-stereo coding with or without inter-channel stereo prediction and to use the frequency-domain coefficients as a sum (mid) or difference (side) spectrum or prediction residual of the inter-channel stereo prediction, with the frequency-domain coefficients arranged in a non-de-interleaved manner, irrespective of the signalization.

A further embodiment comprises a frequency-domain audio decoder as in any of the seven immediately preceding embodiments, wherein the number of the more than one transforms equals 2, and the first transform length is twice the second transform length.

A further embodiment comprises a frequency-domain audio decoder as in any of the eight immediately preceding embodiments, wherein the inverse transformation is an inverse modified discrete cosine transform, MDCT.

A further embodiment comprises a frequency-domain audio encoder supporting transform length switching, comprising a transformer (104) configured to subject time-domain portions of an audio signal to transformation to obtain frequency-domain coefficients of frames of the audio signal;

an inverse scaler (106) configured to inversely scale the frequency-domain coefficients according to scale factors;

a frequency-domain coefficient inserter (108) configured to insert the frequency-domain coefficients of the frames of the audio signal, inversely scaled according to scale factors, into the data stream; and a scale factor inserter (110) configured to insert scale factors into the data stream, wherein the transformer is configured to switch for the frames of the audio signals at least between performing one transform of a first transform length for a respective frame, and performing more than one transform of a second transform length, shorter than the first transform length, for the respective frame, wherein the transformer is further configured to signal the switching by a signalization within the frames of the data stream;

wherein the frequency-domain coefficient inserter is configured to insert, for a respective frame, a sequence of the frequency-domain coefficients of the respective frame of the audio signal, inversely scaled according to scale factors, into the data stream in a manner independent from the signalization, with, depending on the signalization, the sequence of frequency-domain coefficients formed by sequentially arranging the frequency-domain coefficients of the one transform of a respective frame in a non-interleaved manner in case of one transform performed for the respective frame, and by interleaving the frequency-domain coefficients of the more than one transform of the respective frame in case of more than one transform performed for the respective frame, wherein the scale factor inserter operates independent from the signalization.

A further embodiment comprises a method of frequency-domain audio decoding supporting transform length switching, comprising extracting frequency-domain coefficients of frames of an audio signal from a data stream;

extracting scale factors from the data stream;

subjecting the frequency-domain coefficients of the frames, scaled according to scale factors, to inverse transformation to obtain time-domain portions of the audio signal;

combining the time-domain portions to obtain the audio signal, wherein the subjection to inverse transformation is responsive to a signalization within the frames of the audio signal so as to, depending on the signalization, comprise forming one transform by sequentially arranging the frequency-domain coefficients of a respective frame in a non-de-interleaved manner and subjecting the one transform to an inverse transformation of a first transform length, or forming more than one transform by de-interleaving the frequency-domain coefficients of the respective frame and subjecting each of the more than one transforms to an inverse transformation of a second transform length, shorter than the first transform length, wherein the extraction of the frequency-domain coefficients and the extraction of the scale factors are independent from the signalization.

A further embodiment comprises a method of frequency-domain audio encoding supporting transform length switching, comprising subjecting time-domain portions of an audio signal to transformation to obtain frequency-domain coefficients of frames of the audio signal;

inversely scaling the frequency-domain coefficients according to scale factors;

inserting the frequency-domain coefficients of the frames of the audio signal, inversely scaled according to scale factors, into the data stream; and inserting scale factors into the data stream, wherein the subjection to transformation switches for the frames of the audio signal at least between performing one transform of a first transform length for a respective frame, and performing more than one transform of a second transform length, shorter than the first transform length, for the respective frame, wherein the method comprises signaling the switching by a signalization within the frames of the data stream;

wherein the insertion of the frequency-domain coefficients is performed by inserting, for a respective frame, a sequence of the frequency-domain coefficients of the respective frame of the audio signal, inversely scaled according to scale factors, into the data stream in a manner independent from the signalization, with, depending on the signalization, the sequence of frequency-domain coefficients formed by sequentially arranging the frequency-domain coefficients of the one transform of the respective frame in a non-interleaved manner in case of one transform performed for the respective frame, and by interleaving the frequency-domain coefficients of the more than one transform of the respective frame in case of more than one transform performed for the respective frame, wherein the insertion of scale factors is performed independent from the signalization.

A further embodiment comprises a computer program having a program code for performing, when running on a computer, the methods of any of the two immediately preceding embodiments.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Internet Engineering Task Force (IETF), RFC 6716, "Definition of the Opus Audio Codec," Proposed Standard, September 2012. Available online at http://tools.ietf.org/html/rfc6716.

[2] International Organization for Standardization, ISO/IEC 14496-3:2009, "Information Technology—Coding of audio-visual objects—Part 3: Audio," Geneva, Switzerland, August 2009.

[3] M. Neuendorf et al., "MPEG Unified Speech and Audio Coding—The ISO/MPEG Standard for High-Efficiency Audio Coding of All Content Types," in Proc. 132nd Convention of the AES, Budapest, Hungary, April 2012. Also to appear in the Journal of the AES, 2013.

[4] International Organization for Standardization, ISO/IEC 23003-3:2012, "Information Technology—MPEG audio—Part 3: Unified speech and audio coding," Geneva, January 2012.

[5] J. D. Johnston and A. J. Ferreira, "Sum-Difference Stereo Transform Coding", in Proc. IEEE ICASSP-92, Vol. 2, March 1992.

[6] N. Rettelbach, et al., European Patent EP2304719A1, "Audio Encoder, Audio Decoder, Methods for Encoding and Decoding an Audio Signal, Audio Stream and Computer Program", April 2011.

What is claimed is:

1. An audio decoder, comprising an electronic circuit, programmed computer or microprocessor configured to:

extract a sequence of frequency-domain coefficients relating to a frame of an audio signal from a data stream;

extract scale factors for the frame from the data stream;

subject the frequency-domain coefficients, scaled according to the scale factors, to inverse transformation to obtain a time-domain portion of the audio signal corresponding to the frame;

subject the time-domain portion to an overlap-add process to obtain the audio signal, wherein the audio decoder is responsive to a signalization within the data stream for the frame of the audio signal so as to, depending on the signalization, form one transform out of the sequence of frequency-domain coefficients by maintaining a sequential order of the frequency-domain coefficients in the sequence of frequency-domain coefficients and subject the one transform, scaled according to the scale factors, to an inverse transformation of a first transform length, or form more than one transform by de-interleaving the frequency-domain coefficients from the sequence of frequency-domain coefficients and subject, scaled according to the scale factors, each of the more than one transforms to an inverse transformation of a second transform length, shorter than the first transform length, wherein the frequency-domain coefficients are grouped into a number of scale factor bands which is independent from the signalization, and a scale factor is extracted from the data stream for each scale factor band.

2. The audio decoder of claim 1, configured to use context-based entropy decoding to extract the sequence of frequency-domain coefficients from the data stream, with assigning, for each frequency-domain coefficient, a context to the respective frequency-domain coefficient in a manner independent from the signalization.

3. The audio decoder of claim 1, configured to subject the frequency-domain coefficients to scaling according to the scale factors at a spectral resolution independent from the signalization.

4. The audio decoder of claim 1, configured to subject the sequence of frequency-domain coefficients to noise filling, at a spectral resolution which is independent from the signalization.

5. The audio decoder of claim 1, configured to:

in the formation of the one transform, apply inverse temporal noise shaping filtering on the sequence of frequency-domain coefficients using the sequential order, and in the formation of the more than one transforms, apply inverse temporal noise shaping filtering on the sequence of frequency-domain coefficients by de-interleaving the frequency-domain coefficients of the more than one transforms, concatenating of the more than one transforms spectrally transform-wise to yield a concatenation of the more than one transforms and applying the inverse temporal noise shaping filtering on the concatenation of the more than one transforms.

6. The audio decoder of claim 1, configured to support joint-stereo coding with or without inter-channel stereo prediction and to use the sequence of frequency-domain coefficients as a sum or difference spectrum or prediction residual of the inter-channel stereo prediction.

7. The audio decoder of claim 1, wherein the number of the more than one transforms equals 2, and the first transform length is twice the second transform length.

8. The audio decoder of claim 1, wherein the inverse transformation is an inverse modified discrete cosine transform (MDCT).

9. An audio encoder, comprising an electronic circuit, programmed computer or microprocessor configured to:

subject time-domain portions of an audio signal to transformation to obtain, for each time-domain portion, frequency-domain coefficients;

inversely scale the frequency-domain coefficients according to scale factors, wherein the audio encoder configured to switch, for a predetermined frame, between performing one transform of a first transform length, and performing more than one transform of a second transform length, shorter than the first transform length;

signal the switching for the predetermined frame by a signalization within the data stream for the predetermined frame, wherein the audio encoder is configured to:

arrange, for the predetermined frame, the frequency-domain coefficients, inversely scaled according to scale factors, at a sequential order so as to obtain a sequence of frequency-domain coefficients by, depending on the signalization, sequentially arranging the frequency-domain coefficients of the one transform in case of one transform performed for the respective frame, and by interleaving the frequency-domain coefficients of the more than one transform of the respective frame in case of more than one transform performed for the respective frame, so that spectrally corresponding frequency-domain coefficients of the more than two transforms immediately follow each other; and wherein the frequency-domain coefficients are grouped into a number of scale factor bands which is independent from the signalization, and a scale factor is inserted into the data stream for each scale factor band.

10. A method for audio decoding, comprising:

extracting a sequence of frequency-domain coefficients relating to a frame of an audio signal from a data stream;

extracting scale factors for the frame from the data stream;

subjecting the frequency-domain coefficients, scaled according to scale factors, to inverse transformation to obtain a time-domain portion of the audio signal; and subjecting the time-domain portion to an overlap-add process to obtain the audio signal, wherein the subjection to inverse transformation is responsive to a signalization within the data stream for the frame so as to, depending on the signalization, comprise:

forming one transform out of the sequence of frequency-domain coefficients by maintaining a sequential order of the frequency-domain coefficients in the sequence of frequency-domain coefficients and subjecting the one transform, scaled according to the scale factors, to an inverse transformation of a first transform length, or forming more than one transform by de-interleaving the frequency-domain coefficients from the sequence of frequency-domain coefficients and subjecting, scaled according to the scale factors, each of the more than one transforms to an inverse transformation of a second transform length, shorter than the first transform length, wherein the frequency-domain coefficients are grouped into a number of scale factor bands which is independent from the signalization, and a scale factor is extracted from the data stream for each scale factor band.

11. A method for audio encoding, comprising:

subjecting time-domain portions of an audio signal to transformation to obtain, for each time-domain portion, frequency-domain coefficients;

inversely scaling the frequency-domain coefficients according to scale factors;

switching for a predetermined frame between:

performing one transform of a first transform length, and performing more than one transform of a second transform length, shorter than the first transform length;

signaling the switching by a signalization for the predetermined frame within the data stream;

arranging, for the predetermined frame, the frequency-domain coefficients, inversely scaled according to scale factors, at a sequential order so as to obtain a sequence of frequency-domain coefficients by, depending on the signalization, sequentially arranging the frequency-domain coefficients of the one transform in case of one transform performed for the respective frame, and by interleaving the frequency-domain coefficients of the more than one transform of the respective frame in case of more than one transform performed for the respective frame, so that spectrally corresponding frequency-domain coefficients of the more than two transforms immediately follow each other; and wherein the frequency-domain coefficients are grouped into a number of scale factor bands which is independent from the signalization, and a scale factor is inserted into the data stream for each scale factor band.

* * * * *